US012777520B2

(12) United States Patent
Vaidya et al.

(10) Patent No.: US 12,777,520 B2
(45) Date of Patent: Oct. 27, 2026

(54) COMMUNICATION SCHEDULING IN A NETWORK BASED ON LINK QUALITY

(71) Applicant: Charter Communications Operating, LLC, St. Louis, MO (US)

(72) Inventors: Maulik V. Vaidya, Escondido, CA (US); Nima Namvar, Charlotte, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 332 days.

(21) Appl. No.: 18/381,877

(22) Filed: Oct. 19, 2023

(65) Prior Publication Data

US 2024/0306196 A1 Sep. 12, 2024

Related U.S. Application Data

(60) Provisional application No. 63/450,178, filed on Mar. 6, 2023.

(51) Int. Cl.
*H04W 74/0808* (2024.01)
*H04W 72/0446* (2023.01)
(Continued)

(52) U.S. Cl.
CPC .................. *H04W 74/0808* (2013.01); *H04W 72/0446* (2013.01); *H04W 72/21* (2023.01); *H04W 72/542* (2023.01); *H04W 84/12* (2013.01)

(58) Field of Classification Search
CPC ........... H04W 74/0808; H04W 72/542; H04W 84/12; H04W 72/0446; H04W 72/21
See application file for complete search history.

(56) References Cited

U.S. PATENT DOCUMENTS

| | | | | |
|---|---|---|---|---|
| 9,674,861 B1 * | 6/2017 | Pawar | ................. | H04W 72/569 |
| 2005/0215265 A1 * | 9/2005 | Sharma | ................. | H04W 36/22 455/450 |

(Continued)

FOREIGN PATENT DOCUMENTS

| | | | | |
|---|---|---|---|---|
| CN | 114916083 A * | 8/2022 | ........ | H04W 74/0808 |
| EP | 2681960 B1 | 5/2018 | | |

(Continued)

OTHER PUBLICATIONS

Liu, Channel Measuring Method, LBT Failure Reporting Method, Device and Device, Aug. 16, 2022, CN, CN 114916083 A (Year: 2022).*

(Continued)

*Primary Examiner* — Michael K Phillips
(74) *Attorney, Agent, or Firm* — Armis IP Law, LLC

(57) ABSTRACT

A communication management resource such as associated with a first wireless access point receives a first communication from a first mobile communication device. Via the first communication, the communication management resource associated with the first wireless access point determines a channel quality associated with a first wireless channel, the first wireless channel acquirable by the first mobile communication device via clear channel assessment. Based on the determined channel quality, the communication management resource controls conveyance of a second communication between the first mobile communication device and a first wireless access point over the first wireless channel.

29 Claims, 13 Drawing Sheets

(51) Int. Cl.

| | |
|---|---|
| ***H04W 72/21*** | (2023.01) |
| ***H04W 72/542*** | (2023.01) |
| *H04W 84/12* | (2009.01) |

(56) References Cited

U.S. PATENT DOCUMENTS

| | | | | |
|---|---|---|---|---|
| 2008/0274731 | A1* | 11/2008 | Koenck | H04W 52/0261 455/426.1 |
| 2011/0026481 | A1* | 2/2011 | Takamatsu | H04L 1/0026 370/344 |
| 2017/0215200 | A1* | 7/2017 | Mallik | H04W 72/1273 |
| 2017/0280475 | A1* | 9/2017 | Yerramalli | H04W 28/0278 |
| 2018/0352464 | A1* | 12/2018 | Zhou | H04L 5/0055 |
| 2020/0154475 | A1* | 5/2020 | Pao | H04L 5/0094 |
| 2020/0205035 | A1* | 6/2020 | Han | H04W 28/0236 |
| 2020/0314876 | A1* | 10/2020 | Bhattad | H04L 5/0092 |
| 2021/0195446 | A1* | 6/2021 | Sevindik | H04W 76/10 |
| 2022/0104248 | A1* | 3/2022 | Elshafie | H04L 1/1893 |
| 2022/0123902 | A1* | 4/2022 | Panteleev | H04L 1/1887 |
| 2022/0124807 | A1* | 4/2022 | Hu | H04L 5/0051 |
| 2024/0137980 | A1* | 4/2024 | Ajami | H04W 84/12 |
| 2024/0172283 | A1* | 5/2024 | Alabbasi | G06N 3/092 |
| 2025/0266915 | A1* | 8/2025 | Khan Beigi | H04L 1/0026 |

FOREIGN PATENT DOCUMENTS

| | | | |
|---|---|---|---|
| EP | 3304963 | B1 | 1/2020 |
| WO | 2017143004 | A1 | 8/2017 |
| WO | 2021003004 | A1 | 1/2021 |

OTHER PUBLICATIONS

International Preliminary Report on Patentability, Sep. 9, 2025, pp. 1-5.

International Search Report and the Written Opinion, PCT/US2024/016836, May 13, 2024, pp. 1-11.

* cited by examiner

COMMUNICATION SCHEDULING IN A NETWORK BASED ON LINK QUALITY

RELATED APPLICATION

This application claims the benefit of earlier filed U.S. Patent Application Ser. No. 63/450,178 entitled "COMMUNICATION SCHEDULING IN A NETWORK BASED ON LINK QUALITY,", filed on Mar. 6, 2023, the entire teachings of which are incorporated herein by this reference.

BACKGROUND

Conventional Wi-Fi™ Technology includes IEEE 802.11be, which is a so-called Multi-link Operations (MLO), supporting use of multiple wireless communication links to provide wireless connectivity to a communication device. For example, such technology allows a wireless station (such as client device) with multiple radio antennas to simultaneously use one or more channel(s) across multiple unlicensed bands. The MLO technology is seen as a way to enhance the throughput and improve the reliability by means of data aggregation/duplication over multiple independent channels (links).

Conventional OFDMA (Orthogonal Frequency Division Multiplexing) is a technique of subdividing Wi-Fi™ channels into smaller frequency allocations called resource units. By partitioning a respective channel, parallel transmissions of smaller frames to multiple wireless stations can occur simultaneously. Conventional Multi-Link Operation (MLO) in a wireless system enables wireless stations connected to a wireless access point to simultaneously send and/or receive data across different frequency bands and channels. The difference between the two techniques is the granularity of the wireless resources being dedicated to the users.

It is noted that, in addition to MLO, conventional OFDMA technology was introduced in the 802.11ax amendment (WiFi 6) and enables multiple users to share the same link/channel simultaneously by utilizing non-overlapping frequency tones alongside MLO. Both MLO and OFDMA technologies are envisioned to boost the throughput and decrease the latency of Wi-Fi™ networks.

Wi-Fi™ technology implements so-called transmit opportunities (TXOP) in which a wireless station is able to transmit data after acquiring use of a wireless channel. For example, a transmit opportunity (a.k.a., TXOP) is a MAC (Media Access Control) layer feature used in IEEE 802.11-based wireless local area network (WLAN). A TXOP defines the time duration for which a station can send frames after it has acquired rights in the wireless channel. By providing the TXOP time period, conventional TXOP aims to increase the throughput of high priority data, such as voice and video.

BRIEF DESCRIPTION OF EXAMPLES

This disclosure includes the observation that clear channel assessment wireless technology suffers from deficiencies. For example, chief among such shortcomings is the lack of capability in the MLO and OFDMA-enabled APs to make "informed" scheduling decisions. The techniques as discussed herein address this deficiency and allow for a better optimization of the wireless resources over multiple bands/channels/tones.

To meet the stringent latency and aggressive throughput requirements by emerging applications, this disclosure further includes the observation that a refined traffic scheduling technique is useful. For example, the conventional default TID-to-link mapping in 802.11be and conventional Wi-Fi™ suffers from the following limitations: i) all incoming traffic is mapped to all the available links which results in: a) unnecessary contention on all links as they all contend for wireless medium (WM) irrespective of traffic load and urgency, b) all the available links are set up for the duration of association unless an affiliated link is torn down by AP or STA. Such operations add considerable overhead to the wireless system, thereby decreasing the efficiency, c) the constant contention on all links makes it difficult to devise a dynamic load balancing technique which takes advantage of all the available resources; and ii) a respective wireless access point does not receive any information from the wireless stations regarding their channel quality, thus, the wireless access point cannot make informed decision on how to distribute the traffic over the available resources.

The communication management resource can be configured to implement a scheduler function including one or more of: a) single channel in a single band for a single wireless station and no other wireless stations are operating; b) multiple channels in a single band for a single wireless station; c) a single channel per band with multiple bands for a single wireless station; d) multiple channels per band with multiple bands for a single wireless station; or e) any of the above in case of multiple stations.

In contrast to conventional techniques, the communication system and operations as described herein provide better wireless connectivity and more efficient use of wireless bandwidth in a respective network environment of multiple users sharing a respective one or more wireless channels.

More specifically, in accordance with one example, a network environment includes multiple wireless access points including a first wireless access point and corresponding communication management resource. The first wireless access point and corresponding communication management resource receive a first communication such as from a first mobile communication device or other suitable entity. Via the first communication, the wireless access point and corresponding communication management resource determine a channel quality associated with a first wireless channel. The first wireless channel is acquirable by the first mobile communication device and one or more other wireless stations in the network environment via clear channel assessment such as listen before talk function. Based on the determined channel quality, the wireless access point and/or corresponding communication management resource control conveyance of a second communication over a respective wireless communication link between the first mobile communication device and the first wireless access point over the first wireless channel.

In accordance with further examples, determining the channel quality associated with the first wireless channel can be configured to include: retrieving channel quality feedback from the first communication, the first communication received from the first mobile communication device. The channel quality feedback indicates a wireless signal quality associated with the first mobile communication device receiving a wireless signal transmitted from the first wireless access point over the first wireless channel to the first mobile communication device.

Still further, wherein controlling the conveyance of the second communication between the first mobile communication device and the first wireless access point over the first wireless channel include: in response to detecting that the determined channel quality is below a threshold level, preventing the conveyance of the second communication over the first wireless channel.

Yet further, controlling the conveyance of the second communication between the first mobile communication device and the first wireless access point over the first wireless channel can include: allocating use of a second wireless channel to support conveyance of the second communication between the first mobile communication device and the first wireless access point as a substitute to allocating the first wireless channel to convey the second communication.

In accordance with further examples as discussed herein, the communication management resource and corresponding first wireless access point can be configured to receive the first communication at the first wireless access point in response to the first wireless access point wirelessly communicating a command to the first mobile communication device. The command indicates to provide channel quality information associated with the first mobile communication device, which receives a wireless signal from the first wireless access point.

In still further examples, controlled conveyance of the second communication between the first mobile communication device and the first wireless access point via the first wireless channel can include: implementing a load balancing scheduler function. The load balancing scheduler function can be configured to allocate use of the first wireless channel and a second wireless channel depending on the determined channel quality associated with the first wireless channel and a determined channel quality associated with the second wireless channel.

In accordance with yet further examples, the communication management resource and corresponding first wireless access point can be configured to, prior to receiving the first communication, provide notification to the first mobile communication device that the first wireless access point supports load balancing via channel quality assessment provided by one or more mobile communication devices in the network environment.

In further examples, the clear channel assessment as discussed herein requires each of multiple mobile communication devices including the first mobile communication device to implement a respective listen before talk function to acquire use of the first wireless channel prior to transmitting over the first wireless channel.

The communication management resource and first wireless access point as discussed herein can be further configured to, at the first wireless access point, receive a third communication from a second mobile communication device; via the third communication, determine a second channel quality, the second channel quality associated with a second wireless channel. The second wireless channel is acquirable by the first mobile communication device and the second mobile communication device via clear channel assessment. In such an instance, controlling conveyance of the second communication between the first mobile communication device and the wireless access point over the first wireless channel may further include: based on the determined first channel quality and the determined second channel quality, controlling conveyance of the second communication between the first mobile communication device and the first wireless access point over the first wireless channel.

Still further, the first communication can include status information indicative of a buffer status of the first mobile communication device. The buffer status indicates an amount of data (such as measured by bits, bytes, kilobytes, etc.) queued for transmission to the first wireless access point over the first wireless channel. Note that buffer status information (indicating an amount of available data to transmit) may be as-requested (i.e., if a first wireless access point explicitly requests it from a respective first wireless station) or periodic (i.e., first wireless access point requests a respective a first, second, and third wireless station to periodically send such information, wherein a respective period may refer to one OFDM symbol or to multiple OFDM symbols). The communication management resource controls conveyance of the second communication between the first mobile communication device and the first wireless access point via the first wireless channel based on the buffer status associated with the first mobile communication device.

Yet further examples as discussed herein include, via the communication management resource and the first wireless access point, receiving a third communication from the first mobile communication device. Via the third communication, the communication management resource determines a channel quality associated with a second wireless channel. The second wireless channel is also acquirable by the first mobile communication device via clear channel assessment. The communication management resource selects amongst the first wireless channel and the second wireless channel to allocate to the first mobile communication device based on the channel quality associated with the first wireless channel and the channel quality associated with the second wireless channel. As further discussed herein, selection amongst the first wireless channel and the second wireless channel to allocate to the first mobile communication device can include the communication management resource or other suitable entity: comparing the channel quality associated with the first wireless channel and the channel quality associated with the second wireless channel; and in response to detecting that the channel quality associated with the first wireless channel is better than a channel quality associated with the second wireless channel, assigning the first wireless channel for use by the first mobile communication device to transmit the second communication from the first mobile communication device to the wireless access point.

As a further example, the channel quality as indicated by the first communication is a first channel quality associated with the first wireless channel. The communication management resource receives a third communication from a second mobile communication device. Via the third communication, the communication management resource determines a second channel quality associated with the first wireless channel. The first wireless channel is also acquirable by the second mobile communication device via clear channel assessment. The communication management resource select allocation of the first wireless channel to the first mobile communication device and not the second mobile communication device based on determining that the first channel quality is greater than the second channel quality.

In accordance with further examples, when multiple wireless channels are implemented in a communication system, one of the wireless channels can be assigned as the primary channel (a.k.a., master channel). This primary channel can be configured to convey information such as channel sensing information and the transmission/reception of management frames, such as UCQ request and UCQ response frame. When the first wireless access point wants to request a channel measurement on multiple wireless channels, it sends a request on the primary channel to each of one or more wireless stations, and, optionally, on the alternative links, as well. Upon receiving a link quality request from the first wireless access point as discussed herein, the respective wireless station performs a channel measurement on all the available links/tones, and sends a complete report of same to the first wireless access point such as over the primary channel and optionally on the alternative (secondary) link(s) as well. One reason to transmit the generated channel quality information from a respective wireless station to the first wireless access point over the primary channel as well as other wireless channels is that the communicated copy of the same link quality information (i.e. the UCQ Response/Request frame) over multiple channels increases the system reliability and ensures that the recipient such as the first wireless access point receives the information. In other words, communication redundancy ensures that the first wireless access point receives the channel quality information from the respective wireless station.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different examples as described herein.

Yet other examples herein include software programs to perform the steps and operations summarized above and disclosed in detail below. One such example comprises a computer program product including computer readable storage hardware (such as hardware to store executable instructions), non-transitory computer-readable storage media, computer storage hardware, etc., on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, examples herein are directed to a method, system, computer program product, etc., that supports operations as discussed herein.

One example includes a computer readable storage medium and/or system having instructions stored thereon to facilitate better use of available wireless resources such as via channel condition determination as experienced by one or more wireless stations and corresponding scheduling of wireless communications. As further discussed herein, in a case of implementing MLO devices, the proposed system can be configured to allocate different links (such as channels) to the wireless stations. In the case of OFDMA, a single channel can be broken down to non-overlapping segments, called frequency tones. In this latter case, the techniques as discussed herein can be configured to intelligently allocate different tones to different users, because each tone experiences a different channel quality. Thus, a main difference between the two technologies is the granularity of the wireless medium (WM) resources (such as a channel or tones). In a case that the wireless access point and wireless station support multiple links and are OFDMA enabled, the first wireless access point and respective communication scheduling management resource can be configured to allocate the tones on a per link per wireless station wireless station basis. In other words, the basic granularity for wireless resource allocation (bandwidth or portions of bandwidth) is potentially the tones (i.e., sub-channel segments); implementation of the MLO feature leads to the allocation of resources multiple times for multiple links. The instructions, when executed by computer processor hardware, cause the computer processor hardware (such as one or more co-located or disparately processor devices or hardware) to: receive a first communication such as from a first mobile communication device or other suitable entity; via the first communication, determine a channel quality associated with a first wireless channel, the first wireless channel acquirable by the first mobile communication device via clear channel assessment; and based on the determined channel quality, control conveyance of a second communication between the first mobile communication device and a first wireless access point over the first wireless channel.

Note that the ordering of the steps above has been added for clarity sake. Further note that any of the processing steps as discussed herein can be performed in any suitable order. For example, as further discussed herein, one order may be as follows: 1.) the wireless access point requests a respective UCQ (channel quality) measurement from each of one or more wireless stations in a network environment. 2.) The wireless stations reply back by sending a burst of the channel reports back the wireless access point. 3.) The wireless access point, based on the received channel quality information and potentially other available information, decides how to allocate use of the available wireless resources. For example, the wireless access point and corresponding communication management resource can be configured to allocate TXOPs to different user devices in different tones per channel, either in the UP (Uplink) or DL (Downlink) direction.

Another example as discussed herein includes computer-readable storage hardware having instructions stored thereon, the instructions, when carried out by computer processor hardware, cause the computer processor hardware to: receive a first communication from a first mobile communication device; via the first communication, determine a channel quality associated with a first wireless channel, the first wireless channel acquirable by the first mobile communication device via clear channel assessment; and based on the determined channel quality, control conveyance of a second communication over a wireless communication link established between the first mobile communication device and a first wireless access point over the first wireless channel.

Other examples of the present disclosure include software programs and/or respective hardware to perform any of the method example steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless communication services. However, it should be noted that examples herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of examples herein (BRIEF DESCRIPTION OF EXAMPLES) purposefully does not specify every example and/or incrementally novel aspect of the present disclosure or claimed invention(s). Instead, this brief description only presents general examples and corresponding points of novelty over conventional techniques. For additional details and/or possible perspectives (permutations) of the invention(s), the reader is directed to the Detailed Description section (which is a summary of examples) and corresponding figures of the present disclosure as further discussed below.

Figure 1:
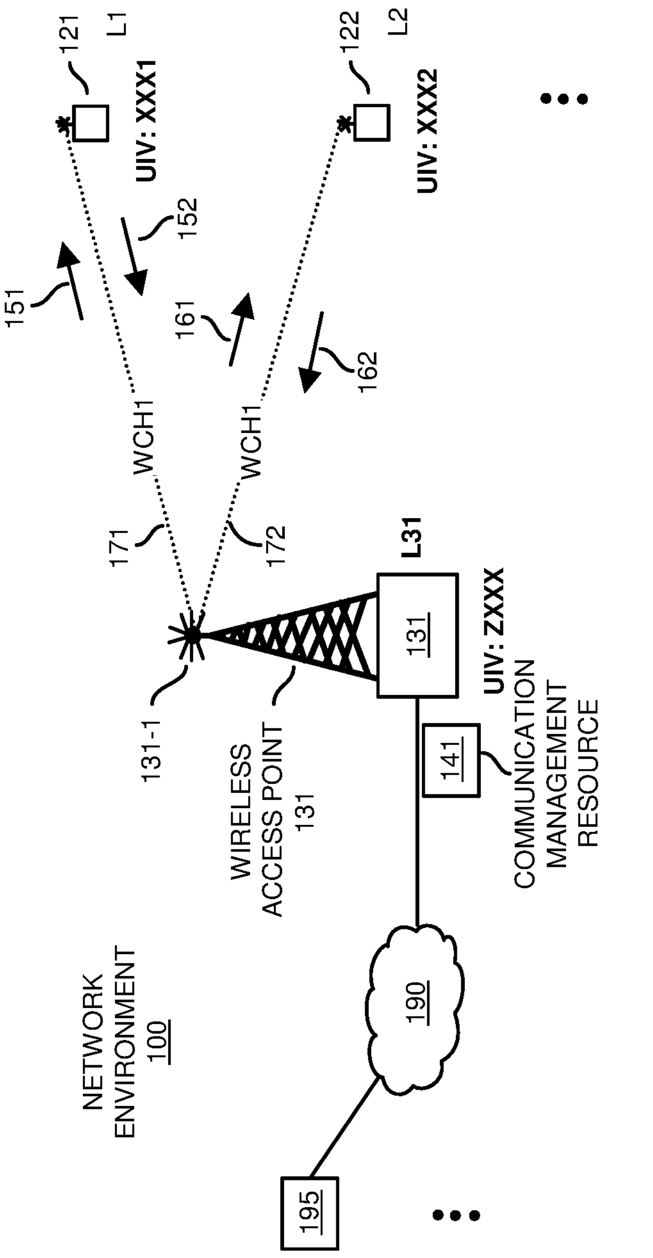
FIG. 1 is an example diagram illustrating a network environment and a wireless access point/communication management resource (such as implementing load-balancing and/or communication scheduling amongst wireless stations) as discussed herein.

The foregoing and other objects, features, and advantages of the invention will be apparent from the following more particular description of preferred examples herein, as illustrated in the accompanying drawings in which like reference characters refer to the same parts throughout the different views. The drawings are not necessarily to scale, with emphasis instead being placed upon illustrating the examples, principles, concepts, etc.

DETAILED DESCRIPTION

Now, more specifically, with reference to the drawings, FIG. 1 is an example diagram illustrating a network environment and a wireless access point/communication management resource (such as implementing load-balancing and/or communication scheduling amongst wireless stations) as discussed herein.

As shown, network environment 100 includes server resource 195, network 190, wireless access point 131, and one or more instances of user equipment such as mobile communication device 121, mobile communication device 122, etc. Network environment 100 includes any number of wireless access points and any number of corresponding mobile communication devices.

As further shown, wireless network environment 100 further includes communication management resource 141. Note that the communication management resource 141 executes operations or any of the functionality as described herein associated with the wireless access point 131. The communication management resource 141 can be located at the wireless access point 131 or at one or more disparate locations with respect to the wireless access point 131.

Note that each of the resources in network environment 100 can be configured to include or be configured as appropriate hardware, software, or combination of hardware and software to carry out respective operations as discussed herein.

For example, the communication management resource 141 as described herein can be implemented via respective communication management hardware, communication management software, or a combination of communication management hardware and communication management software; the wireless access point 131 as described herein can be implemented via respective wireless access point hardware, wireless access point software, or a combination of wireless access point hardware and wireless access point software; communication device 121 can be implemented via communication device hardware, communication device software, or a combination of communication device hardware and communication device software; and so on.

Further in this example, each of the wireless stations is assigned a respective unique identifier value (such as network address for routing purposes) supporting communication of wireless messages. For example, wireless access point 131 at location L31 is assigned unique identifier value ZXXX; communication device 121 at location L1 is assigned unique identifier value XXX1; communication device 122 is assigned XXX2, and so on.

As further shown, each of the wireless access points in network environment 100 includes respective one or more instances of antenna hardware to wirelessly communicate directly with mobile communication devices (a.k.a., user equipment) and directly with the repeater wireless station 151.

For example, the wireless access point 131 includes one or more instances of antenna hardware 131-1 (such as one or more antenna elements). Note that different sets of the antenna elements associated with the antenna hardware 131-1 can be configured to support different beamforming to transmit first wireless communications and receive second wireless communications in the network environment 100.

The wireless stations such as mobile communication device 121, mobile communication device 122, wireless access point 131, etc., support any of one or more wireless communications via one or more wireless communication protocols in one or more wireless frequency bands (unlicensed or licensed bands) such as 2.4 GHz (2.4 to 2.5 GHz), 5 GHz (5.1 to 5.9 GHZ), and/or 6 GHz (5.9 to 7.1 GHZ). Further in this example, the wireless access point 131 implements antenna hardware 131-1 to transmit wireless signals 151, 161, etc. The wireless access point 131 implements antenna hardware 131-1 to receive wireless signals 152, 162, etc., from the mobile communication devices.

For example, the wireless access point 131 establishes wireless communication link 171 between the wireless access point 131 and the mobile communication device 121. Via wireless communications 151, the wireless access point 131 communicates messages (such as instructions and/or data) over wireless channel WCH1 in the downlink direction to the mobile communication device 121. Further, the mobile communication device 121 transmits wireless communications 152 over the wireless channel WCH1 in the uplink direction to the wireless access point 131. Via the communications 151 and communications 152, the wireless access point 131 provides the mobile communication device 121 access to the remote network 190 and any of one or more server resources 195. As its name suggests, note further that the mobile communication device 121 (a.k.a., wireless station) can be configured to move around the network environment 100.

Still further, note that each of the wireless stations (wireless access point 131, mobile communication device 121, mobile communication device 122, etc.) in the network environment 100 can be configured to implement a respective clear channel assessment function (a.k.a., listen before talk function) prior to transmitting communications in the network environment 100. For example, the mobile communication device 121 can be configured to implement a listen before talk function in which the mobile communication device 121 needs to acquire the wireless channel WCH1 before it is allowed to communicate in the uplink direction to the wireless access point 131. Acquisition of the wireless channel WCH1 by the mobile communication device 121 may include the mobile communication device 121 detecting that a power level of wireless signals transmitted in the wireless channel WCH1 or corresponding wireless channel of interest is below a threshold level for a monitored listen before talk time duration for clear channel assessment.

The wireless access point 131 establishes wireless communication link 172 between the wireless access point 131 and the mobile communication device 122. Via wireless communications 161, the wireless access point 131 communicates messages (such as instructions and/or data) over wireless channel WCH1 in the downlink direction to the mobile communication device 122. Further, the mobile communication device 122 transmits wireless communications 162 over the wireless channel WCH1 in the uplink direction to the wireless access point 131. Via the communications 161 and 162, the wireless access point 131 provides the mobile communication device 122 access to the remote network 190 and any of one or more server resources 195. Note further that the mobile communication device 122 (a.k.a., wireless station) can be configured to move around the network environment 100.

As previously discussed, each of the wireless stations in the network environment 100 can be configured to implement a respective clear channel assessment prior to transmitting communications in the network environment 100. For example, the mobile communication device 122 can be configured to implement a listen before talk function in which the mobile communication device 122 needs to acquire the wireless channel WCH1 before it is allowed to communicate in the uplink direction to the wireless access point 131. Acquisition of the wireless channel WCH1 by the mobile communication device 122 may include the mobile communication device 122 detecting that a power level of wireless signals transmitted in the wireless channel WCH1 is below a threshold level for a listen before talk time duration.

In a similar manner, each of the wireless stations in the network by 100 can be configured to implement listen before talk functions to acquire a respective wireless channels transmit corresponding wireless communications.

Figure 2:
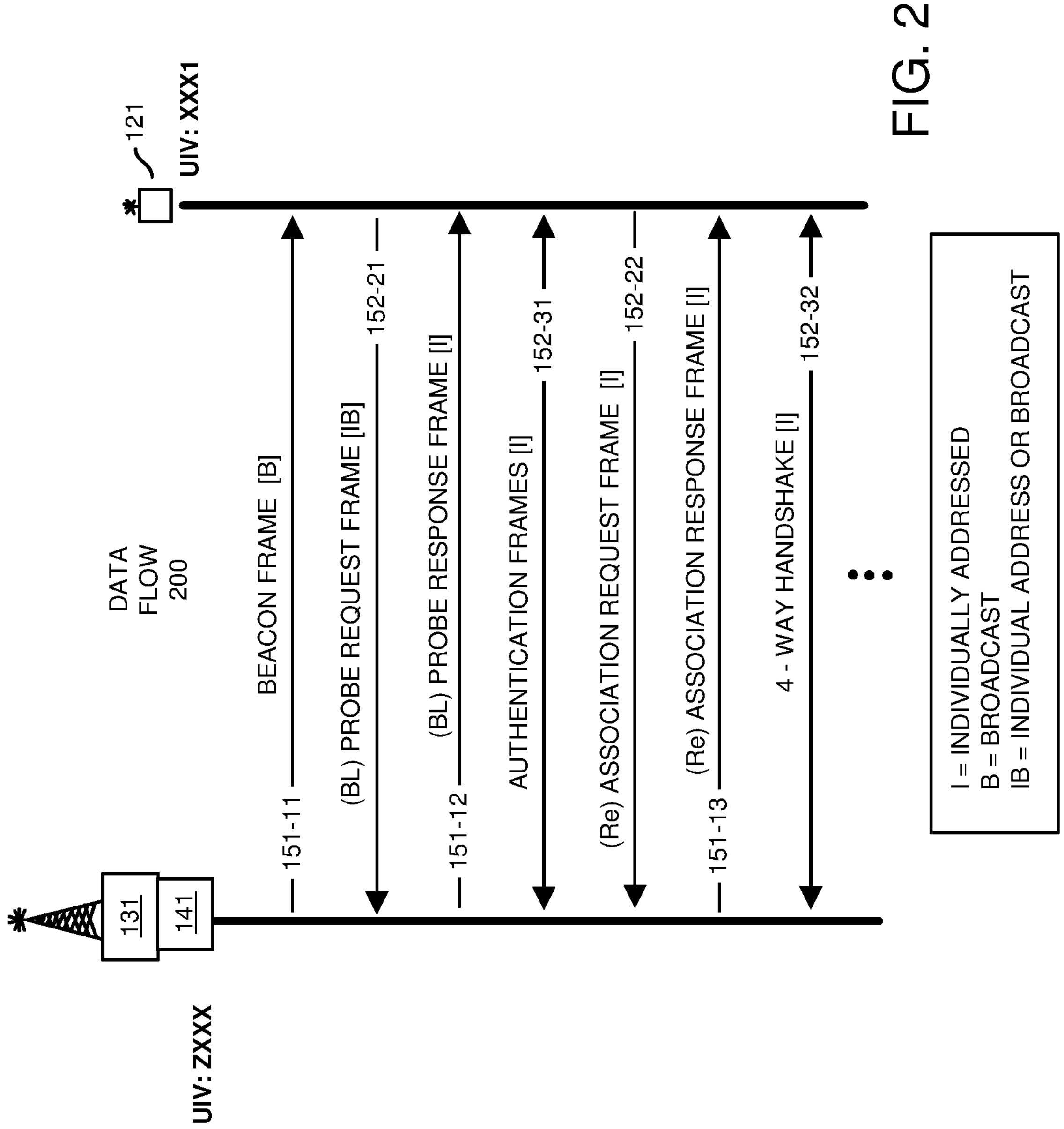
FIG. 2 is an example diagram illustrating communications supporting operation of wireless stations in a load-balancing mode (BL mode) as discussed herein.

FIG. 2 is an example diagram illustrating configuration communications supporting operation of wireless stations in a load-balancing mode (BL mode) as discussed herein.

In this example, a new operating mode of Balanced Links (BL) (a.k.a., balanced link mode) is proposed for introduction to wireless communications such as those supported by in IEEE 802.11 or any other suitable wireless protocol implementing clear channel assessment and/or listen before talk functionality. Both the wireless access point 131 and the wireless stations in the network environment 100 (such as mobile communication device 121, mobile communication device 122, etc.) can be configured to indicate support for BL (Balanced Link) mode (a.k.a., BLM) via a so-called Balanced Load Information Element (BLIE) in order to use such functionality. As discussed herein, the balanced link mode enables the wireless access point 131 and corresponding communication management resource 141 to intelligently (such as via scheduling, load-balancing, etc.) to control conveyance of wireless communications amongst wireless stations in the network environment 100.

Note that the BLIE (Balanced Load Information Element) sub-field 320 (see an example in FIG. 3) can potentially be included in each of the Beacon and Association Request/Response frames. The BL Information subfield 320 in the BLIE frame can be configured to carry information about the type and length of measurement of channel quality as well as the scheduled time to send the measurement report (of channel quality) to the wireless access point 131.

If both the wireless access point 131 and the communication device 121 support the balanced link mode, the balanced link mode is enabled between the wireless access point 131 and the mobile communication device 121. In general, as further discussed herein, the balanced link mode allows the mobile communication device 121 (a.k.a., wireless station) to provide feedback on one or more Uplink Channel Quality (UCQ) links to the wireless access point 131. The uplink channel quality feedback can indicate channel quality associated with one or more wireless channels. As further discussed herein, the wireless access point 131 and corresponding communication management resource 141 use this feedback information to control (such as schedule) conveyance of wireless communications between the mobile communication device 121 and the wireless access point 131 in the uplink and/or downlink.

The so-called UCQ (Uplink Channel Quality) information present in the corresponding channel quality feedback information from the one or more communication devices in the network environment 100 can be utilized by the wireless access point 131 and corresponding communication management resource 141 to intelligently control distribution (scheduling) of the data traffic over the available one or more wireless channels and so-called tones of wireless channels in both the Uplink and Downlink directions due reciprocity of the link quality in the uplink and the downlink. In other words, it can be assumed that the uplink quality of communications from the communication device 121 to the wireless access point 131 is likely very similar to the downlink quality of wireless communications communicated from the wireless access point 131 to the communication device 121 for a given wireless channel.

In particular, as discussed herein, the balanced link mode allows the wireless access point 131 and corresponding communication management resource 141 to, when needed, completely steer data traffic over a respective wireless communication link away from certain bands, channels, or tones (depending on the underlying technology of the communication device) for certain mobile communication devices (a.k.a., STAs) that suffer from poor channel quality.

As a more specific example, as shown in data flow 200 of FIG. 2, via wireless communications 151-11, the wireless access point 131 communicates (such as via broadcast communications) notification in a respective beacon frame from the wireless access point 131 to the communication device 121 that the wireless access point 131 supports a balanced link mode. The communications 151-11 can be configured to indicate that the wireless access point 131 and corresponding communication management resource 141 support a so-called balanced link mode as described herein.

In response to receiving the communications 151-11, the communication device 121 determines whether it supports the balanced link mode and whether the communication device 121 would like to implement the balanced link mode capability. In this example, assume that the communication device 121 determines that it supports the balanced link mode and would like to implement it. In such an instance, in response to the communication device 121 desiring to implement the balanced link mode capability, via wireless communications 152-21, the communication device 121 requests further information about the balance link mode and setting it up via transmission of a probe request frame (communications 152-21) to the wireless access point 131. The probe request frame from the communication device 121, such as via communications 152-21, may include a respective identity (such as network address or other suitable information) of the communication device 121. This enables the wireless access point 131 to direct specific response communications directly to the network address XXX1 of the communication device 121.

In response to receiving the wireless communications 152-21 (such as probe request frame requesting balance link mode information and/or other information) from the communication device 121, the wireless access point 131 transmits wireless communications 151-12 such as a probe response frame to the communication device 121. Note that the wireless communications 151-12 may include a respective network address XXX1 assigned to the communication device 121.

As further shown, via communications 152-31 between the wireless access point 131 and the communication device 121, the communication device 121 provides authentication information used by the wireless access point 131 to authenticate the communication device 121 for establishing a respective wireless communication link 171 between the wireless access point 131 and the mobile communication device 121.

Subsequent to authentication, via communications 152-22, the communication device 121 communicates a respective association request frame to the wireless access point 131 requesting to establish a respective wireless communication link 171.

In response to receiving the Association request frame in communications 152-22, via communications 151-13, the wireless access point 131 communicates a respective Association response frame to the communication device 121 to establish the wireless communication link 171 between the wireless access point 131 and the mobile communication device 121 (such as user equipment operated by a respective user).

Further in this example, communications 152-32 support a four-way handshake between the wireless access point 131 and the communication device 121. The four-way handshake is a type of network authentication protocol established by 802.11i that involves standards set up for the construction and use of wireless local area networks (WLANs). The four-way handshake provides a secure authentication strategy for data delivered through network architectures.

Figure 3:
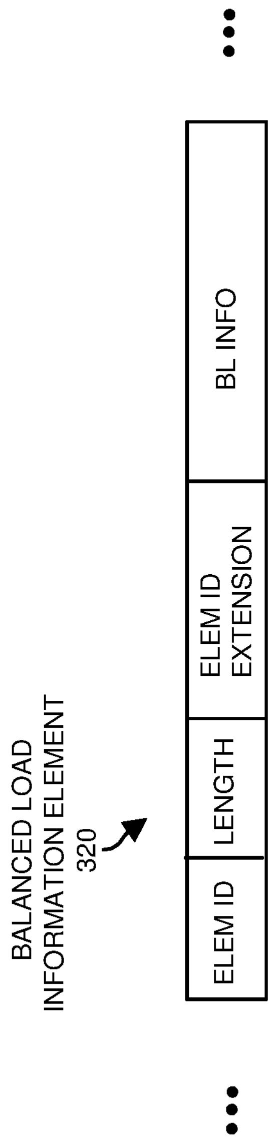
FIG. 3 is an example diagram illustrating a communication supporting load-balancing as discussed herein.

FIG. 3 is an example diagram illustrating a communication supporting configuration of load-balancing as discussed herein.

Note again that the balanced load information element 320 (such as BLIE), as previously discussed and as shown in FIG. 3, can be configured to include information such as the element ID associated with the communication device 121, length information, element ID extension information, and any balanced load information. The balanced load information can be included in any of one or more beacon and Association frames to support the balanced link mode as described herein.

Figure 4:
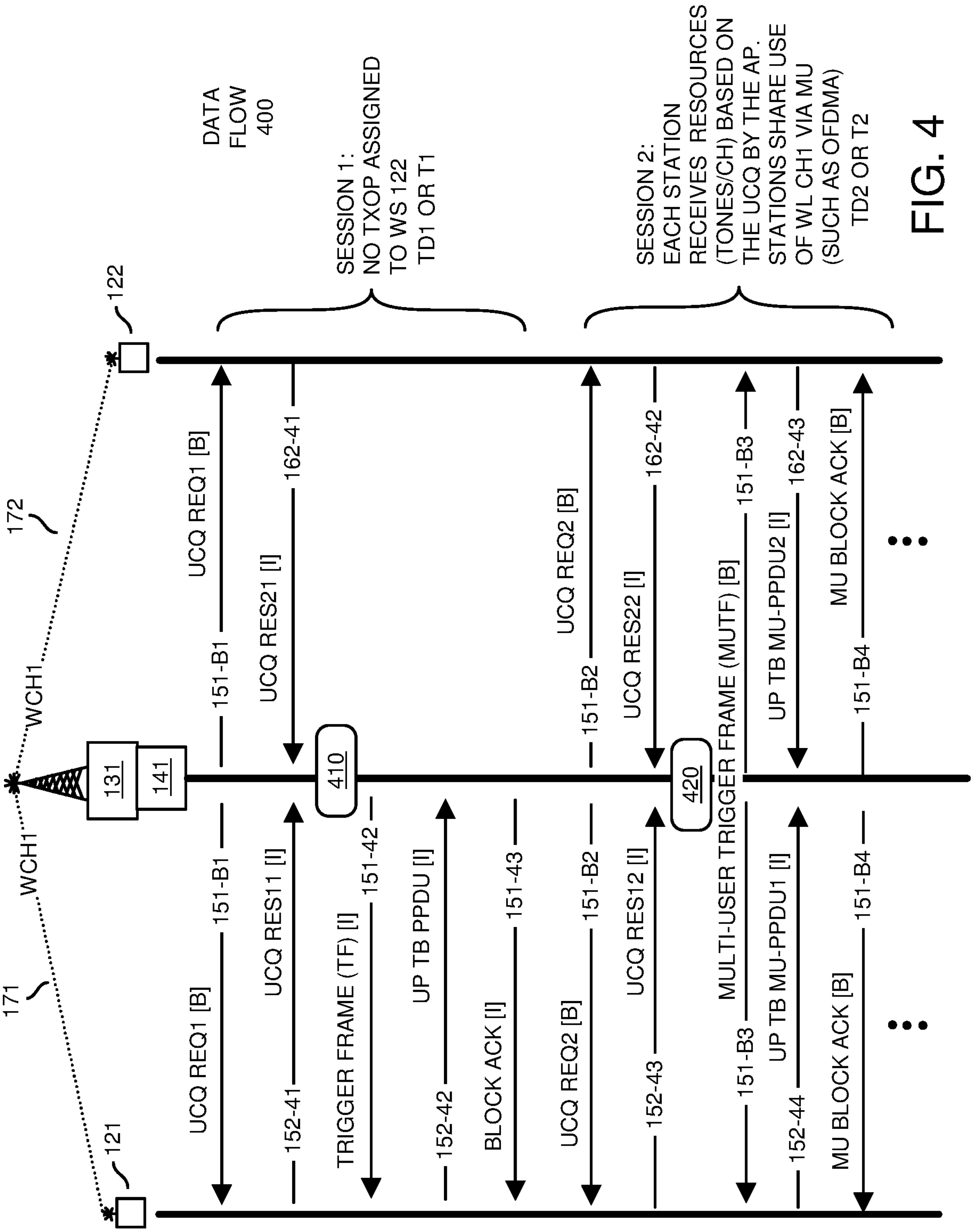
FIG. 4 is an example diagram illustrating a data flow of a wireless access point receiving wireless channel quality feedback information for a single wireless channel and subsequent allocation (scheduling) of wireless communications based on the wireless channel quality feedback received from one or more wireless stations as discussed herein.

FIG. 4 is an example diagram illustrating a data flow of a wireless access point receiving wireless channel quality feedback information for a single wireless channel and subsequent allocation (scheduling) of wireless communications based on the wireless channel quality feedback received from one or more wireless stations as discussed herein.

When a respective wireless access point 131 and mobile communication device 121, mobile communication device 122, etc., are operated in a balanced link mode, based on various metrics, the wireless access point 131 and corresponding communication management resource 141 continuously perform resource assignments (such as scheduling of available wireless bandwidth in one or more wireless channels) in downlink and uplink directions.

One implementation of the communication system as described herein assumes the use of a multi-user scenario (e.g., OFDM-A or Orthogonal Frequency Division Multiple Access) in both the DL (a.k.a., downlink) and UL (a.k.a., uplink) directions by the respective wireless stations. For example, the wireless communication link 171 and wireless communication link 172 can be configured to support uplink and downlink communications via OFDM-A out of suitable communications standard.

The wireless access point 131 operating in BL mode (i.e., balanced link mode) can be configured to generate various scheduling decisions including complete re-allocation of tones and/or wireless channels away from a particular wireless station if the wireless channel does not support appropriate quality of service between the wireless access point and the corresponding mobile communication device. In other words, this disclosure includes implementation of a respective scheduler (a.k.a., communication management resource 141) associated with the wireless access point 131 that detects conditions in which a respective wireless channel provides poor signal quality between the wireless access point 131 and a corresponding mobile communication device. In such an instance, the wireless access point 131 and corresponding communication management resource 141 can be configured to schedule best available resources to support wireless communications, providing better efficiency and use of the available wireless bandwidth such as one or more wireless channels.

If desired, an affected one or more wireless communication links (or wireless channels) such as those experiencing poor quality at a particular time or time duration may still be kept active and available without a buffer of actual user-data payload ready for conveyance over the one or more wireless communication links.

Yet further, as discussed herein, each wireless access point (of multiple wireless access points in the network environment 100) implementing the balanced link mode capability can be configured to instruct one or more respective wireless stations to provide UCQ (uplink channel quality feedback) on a link, which may or may not have user-data payload exchange ready to transmit.

Thus, the communication system as discussed herein introduces a new CCA (i.e., clear channel assessment) mode with a short channel access time such that a new time duration (such as a so-called TXOP window) is granted by the respective wireless access point to the one or more wireless stations to allow a short-burst transmission of wireless channel quality feedback information collected by the wireless stations to be communicated to the respective wireless access point. In such an instance, via the received wireless communication link feedback information, the wireless access point 131 and corresponding communication management resource 141 are aware of the different link qualities (associated with wireless communication link 171, wireless communication link 172, etc.) at different times. 132, etc.

As further discussed herein, a request for channel quality feedback (such as a so-called UCQ-REQUEST frame) can be transmitted either as multicast or broadcast frame, depending on various conditions such as depending on the buffer status in the respective wireless access point and wireless stations, as well as the TID (Traffic Identifier) requirements (indicating priority levels) associated with data in buffers ready to be transmitted.

Further in this example, the request (such as UCQ request) for channel quality feedback information causes each of the remote wireless stations (a.k.a., mobile communication devices) to respond with channel quality feedback information (such as a so-called UCQ-RESPONSE PPDU response) irrespective of their buffer status. In other words, as previously discussed, the wireless stations that are requested to respond with channel quality feedback information may or may not have data stored in a buffer for transmission over a respective wireless communication link.

Regardless of whether the wireless stations have any data payload to transmit over a next available TXOP (i.e., time slot or time duration to potentially transmit if the wireless channel WCH1 is free), the notified wireless stations comply with the respective wireless access points request for channel quality feedback information. Based on the received channel quality feedback information received from one or more mobile communication devices present in the network environment 100, the respective wireless access point is then able to make a good decision as to use of available wireless bandwidth.

Note further that one way to schedule or grant use of wireless bandwidth to a respective mobile communication devices includes the wireless access point transmitting channel grant communications such as so-called sends a MU-Trigger Frame to schedule the resources for one or more upcoming TXOPs.

Now, more particularly, the data flow 400 in FIG. 4 illustrates implementation of scheduling use of available wireless resources while in a so-called balanced link mode.

Subsequent to the wireless access point 131 and corresponding communication management resource 141 being informed that the communication device 121 and communication device 122 support the balanced link mode (a.k.a., scheduling mode) as discussed herein, the communication management resource 141 and corresponding wireless access point 131 schedules communications over a wireless channel #1 (WCH1) via data flow 400.

Initially, via communications 151-B1, the wireless access point 131 and corresponding communication management resource 141 transmit a command (such as request) notifying the respective recipient mobile communication device 121 and mobile communication device 122 to generate channel quality feedback information associated with reception of wireless signals over the wireless channel WCH1. If desired, the wireless access point 131 and corresponding communication management resource 141 can be configured to transmit a respective one or more reference signals in the network environment 100. In response to receiving the respective communications 151-B1, each of the mobile communication devices 121 and 122 determine a power level of receiving wireless communications from the wireless access point 131.

As previously discussed, channel quality (such as the performance ability to communicate wireless communications in an uplink or downlink direction in the network environment 100) can be determined in any suitable manner. As an alternative to each of the communication devices 121, 122, etc., determining channel quality based on one or more signals received from the wireless access point 131, the wireless access point 131 can be configured to monitor wireless communications from one or more wireless stations in the network environment 100 to determine corresponding channel quality associated with the respective available wireless channels.

Note further that the channel quality feedback information generated by each of the mobile communication devices or feedback information can include any information associated with a wireless channel WCH1 such as a signal to noise ratio of the respective mobile communication device receiving wireless signals transmitted by the wireless access point 131, a bit error rate associated with receiving wireless communications from the wireless access point 131, wireless interference associated with the wireless channel WCH1, a data rate associated with receiving wireless communications from the wireless access point 131, etc. Thus, each of the mobile communication device 121 and mobile communication device 122 determine a link or channel quality associated with use of the wireless channel WCH1 to convey wireless data in the downlink. As previously discussed, it may be presumed that the respective uplink channel quality from the mobile communication devices to the wireless access point 131 is similar to the respective downlink quality reported by the respective mobile communication devices.

After generating the respective link quality feedback information as requested by the communications 151-B1 (such as broadcast communications including a UCQ Request), the mobile communication device 121 communicates the respective link quality feedback information associated with the wireless channel WCH1 to the wireless access point 131 via communications 152-41 (such as UCQ response). In such an instance, via the respective UCQ feedback responses, the wireless access point 131 is now aware of the ability of the wireless channel WCH1 to convey respective wireless signals from the mobile communication device 121 to the wireless access point 131. For example, via the communications 152-41 communicated from the mobile communication device 121 to the wireless access point 131, the wireless access point 131 and corresponding communication management resource 141 determines the performance capability associated with the wireless communication link 171.

As previously discussed, note again that the communications 152-41 are not limited to merely respective wireless channel quality feedback information. Such communications 152-41 can further include useful information such as the type (and corresponding priority) of data and/or amount of data at the mobile communication device 121 in a data buffer of the mobile communication device 121 waiting for transmission over the wireless communication link 171 to the wireless access point 131.

After generating the respective link quality feedback information (indicating the corresponding ability for a wireless communication link 172 to convey wireless communications) as requested by the communications 151-B1 (such as broadcast communications including a UCQ Request), as previously discussed, the mobile communication device 122 communicates the respective link quality feedback information associated with the wireless channel WCH1 to the wireless access point 131 via communications 162-41 (such as UCQ response). In such an instance, the wireless access point 131 is now aware of the ability of the wireless channel WCH1 to convey respective wireless signals from the mobile communication device 122 to the wireless access point 131. Note that the communications 162-41 are not limited to merely respective wireless channel quality feedback information. Such communications 162-41 can further include useful information such as the type (and corresponding priority) of data and/or amount of data at the mobile communication device 122 in a respective buffer of the mobile communication device 122 waiting for transmission over the wireless communication link 171 to the wireless access point 131.

Accordingly, via the communications 162-41 communicated from the mobile communication device 122 to the wireless access point 131, the wireless access point 131 and corresponding communication management resource 141 determine the performance capability associated with the wireless communication link 172.

As further shown in this example, at operation 410, the wireless access point 131 and corresponding communication management resource 141 implements a respective scheduler to determine best upcoming use of the wireless channel WCH1 in view of the link quality performance information (communications 152-41) received from the mobile communication device 121 and the link quality performance information (communications 162-41) received from the mobile communication device 122. See FIG. 5 for an example of feedback information provided by each mobile communication device.

Figure 5:
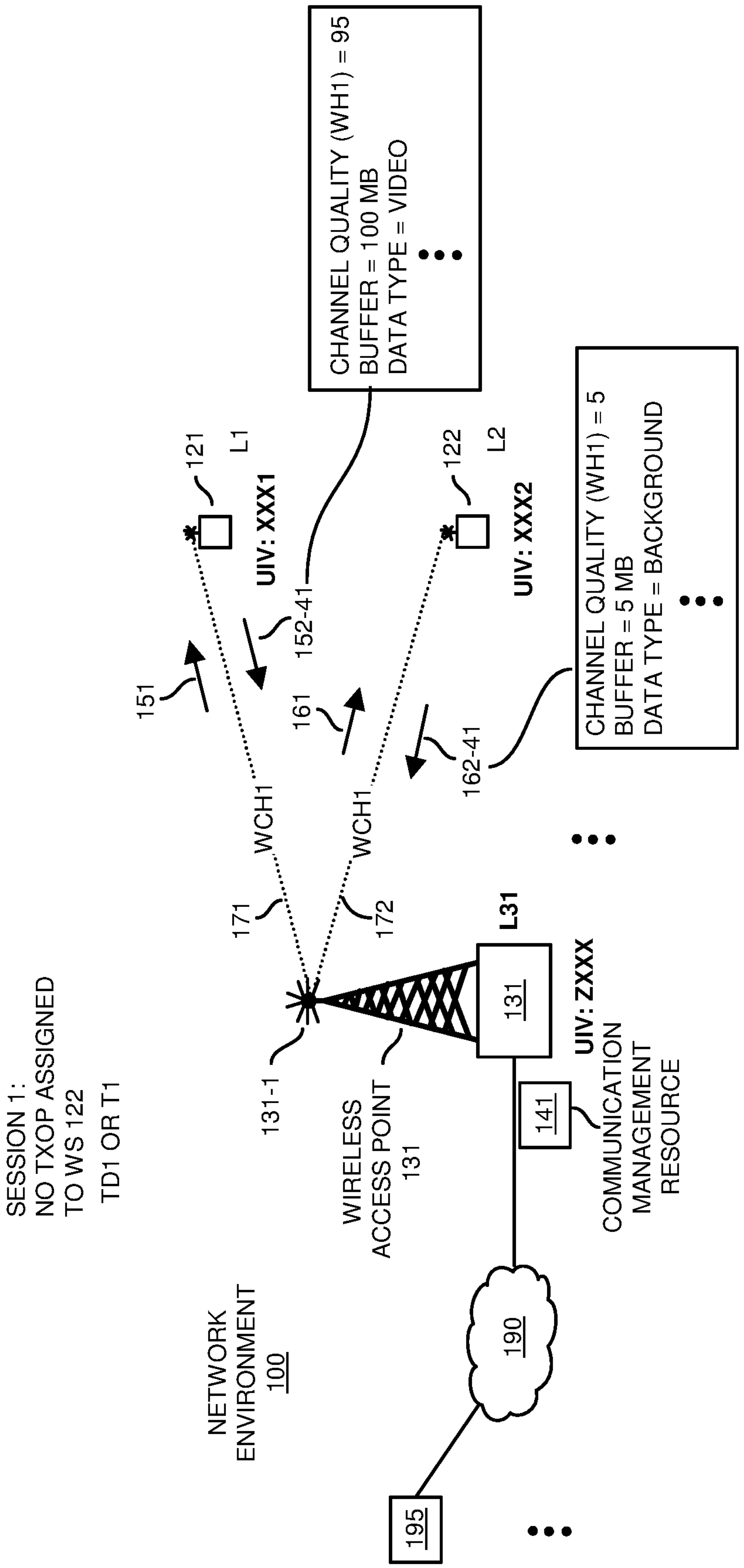
FIG. 5 is an example diagram illustrating operating conditions associated with the wireless network at or around time duration TD1 or time T1 as described herein.

FIG. 5 is an example diagram illustrating operating conditions associated with the wireless network at or around time duration TD1 or time T1 as described herein.

In this example, for session 1, in response to receiving a request for channel quality feedback information or other status information associated with the mobile communication device 121, the mobile communication device 121 provides information in communications 152-41 such as: a channel quality of receiving communications from the wireless access point 131 over the wireless channel WCH1 as 95 (where channel quality is based on a scale of 0 to 100, where 0 is the worst channel quality and where 100 is the best channel quality supporting highest bit rate throughput); the mobile communication device 121 has a full buffer of 100 Megabytes; the type of data in the buffer is VIDEO, high priority, etc.

Further in this example, in response to receiving a request for channel quality feedback information or other status information associated with the mobile communication device 122, the mobile communication device 122 provides information in communications 162-41 such as: a channel quality of receiving communications from the wireless access point over wireless channel WCH1 as 5 (where channel quality is based on a scale of 0 to 100, where 0 is the worst channel quality and where 100 is the best channel quality); the mobile communication device 121 has a fairly empty buffer of 5 Megabytes; the type of data in the buffer is Background, lowest priority, etc.

Referring again to FIG. 4, in in operation 410, based on the received wireless station feedback information, or absence of the communication management resource 141 receiving link quality information feedback, the communication management resource 141 produces a scheduling decision to convey one or more communications over the established wireless communication link. Note that absence of receiving link quality information feedback from a wireless station may indicate very good link quality or very bad link quality or even a communication failure or any other condition.

In one example, the wireless access point 131 determines that the mobile communication device 122 experiences a high amount of wireless interference associated with the wireless channel WCH1 and the mobile communication device 121 experiences a low amount of wireless interference associated with the wireless channel WCH1. In such an instance, the wireless channel WCH1 is congested for the mobile communication device 122 but not congested for the mobile communication device 121. Use of the wireless channel WCH1 is best allocated to the mobile communication device 121 experiencing the low amount of wireless interference on that channel. The wireless access point 131 and corresponding communication management resource 141 therefore select the one or more next time slot(s) or time durations for assignment to the mobile communication device 121 for transmitting respective data in the uplink over wireless channel WCH1.

As previously discussed, the wireless access point 131 and corresponding communication management resource 141 can be configured to select the wireless channel WCH1 for assignment to the mobile communication device 121 based on other factors such as because the mobile communication device has a very high amount of data stored in the respective buffer for communication to the wireless access point 131. Additionally or alternatively, the wireless access point 131 and corresponding communication management resource 141 can be configured to select the wireless channel WCH1 for assignment to the mobile communication device 121 based on other factors such as because the mobile communication device has higher priority data for transmission to the wireless access point 131 respectively low priority data associated with the mobile communication device 122.

Via communications 151-42 (such as a so-called trigger frame message including an identity such as XXX1 of the mobile communication device 121 and notification of assignment of a particular time slot(s) or time duration of wireless channel WCH1 to the mobile communication device 121), the wireless access point 131 and corresponding communication management resource 141 provides notification of assignment of the next available TXOP (time slot, time duration, etc.) to the mobile communication device 121 to transmit in the uplink over wireless channel WCH1 to the wireless access point 131.

In response to receiving the assignment or allocation of the respective wireless bandwidth resources (such as time slot, time slots, time duration, etc.), prior to transmitting in the respective allocated one or more time slots, the mobile communication device 121 implements a listen before talk function in the allocated one or more timeslots. The implemented listen before talk function includes the mobile communication device 121 determining if and when the wireless channel WCH1 is free from other wireless stations communicating over the wireless channel based on monitoring for wireless energy in the wireless channel WCH1 being below a threshold level for each allocated time slot or TXOP. When the mobile communication device 121 acquires the wireless channel WCH1 in response to implementing the listen before talk function and the channel is free (such as detected wireless any energy in the wireless channel WCH1 being below and energy threshold level indicating a clear channel for the corresponding allocated one or more timeslots), the mobile communication device 121 wirelessly communicates the data in its buffer (in communications 152-42) to the wireless access point 131 over the wireless channel WCH1 and corresponding wireless communication link 171 during the allocated time slot of acquired wireless channel WCH1.

In response to receiving the data transmitted over the uplink from the mobile communication device 121 to the wireless access point 131 via communications 152-42, the wireless access point 131 and corresponding communication management resource 141 transmit communications 151-43 to the mobile communication device 121. The communications 153-43 provide notification to the mobile communication device 121 that the wireless access point correspond communication management resource 141 receives the communications 152-42 and corresponding data from the mobile communication device 121.

Accordingly, for the first session (session 1), the wireless access point 131 steers away (such as prevents) wireless resources from being used by the mobile communication device 122 from transmitting data traffic over wireless channel WCH1 (or portion thereof) because the mobile communication device 122 experiences high wireless interference with respect to wireless channel WCH1 at or around time duration TD1 or time T1. In other words, the communication management resource 141 does not schedule uplink communications from the communication device 122 to the wireless access point 131 because of the detected poor uplink channel conditions for that monitored time duration. As further discussed herein, when the link quality conditions associated with the wireless communication link 170 eventually improve over time, the communication management resource 141 and the wireless access point 131 allocate use of the wireless channel WCH1 for use by the communication device 122 to communicate over the wireless communication link 172.

To provide use of the available wireless channel WCH1 amongst multiple wireless stations, the wireless access point and the corresponding communication management resource 141 repeat this process of scheduling and assigning use of respective wireless bandwidth or portions of wireless bandwidth associated with the wireless channel WCH1 based upon changing needs and changing operating conditions in the network environment 100.

For example, in session 2, via communications 151-B2, the wireless access point 131 and corresponding communication management resource 141 transmit a command notifying the respective recipient mobile communication device 121 and mobile communication device 122 to generate channel quality feedback information associated with reception of wireless signals over the wireless channel WCH1. If desired, the wireless access point 131 and corresponding communication management resource 141 can be configured to transmit a respective one or more reference signals in the network environment 100. In response to receiving the respective communications 151-B2, each of the mobile communication devices 121 and 122 determine a wireless power level of receiving wireless communications from the wireless access point 131.

Note again that the channel quality feedback information generated by each of the mobile communication devices or feedback information can include any information associated with wireless channel WCH1 such as a signal to noise ratio of the respective mobile communication device receiving wireless signals transmitted by the wireless access point 131, wireless interference information as well as wireless channel WCH1, a bit error rate associated with receiving wireless communications from the wireless access point 131, a data rate associated with receiving wireless communications from the wireless access point 131, etc. Thus, each of the mobile communication device 121 and mobile communication device 122 determine a link or channel quality associated with the use of the wireless channel WCH1 to convey wireless data in the downlink. It is presumed that the respective uplink channel quality from the mobile communication devices to the wireless access point 131 is similar to the respective downlink quality reported by the respective mobile communication devices.

After generating the respective link quality feedback information as requested by the communications 151-B2 (such as broadcast communications including a UCQ Request), the mobile communication device 121 communicates the respective link quality feedback information associated with the wireless channel WCH1 to the wireless access point 131 via communications 152-43 (such as UCQ response). In such an instance, the wireless access point 131 is now aware of the ability of the wireless channel WCH1 for time T2 or time duration TD2 to convey respective wireless signals from the mobile communication device 121 to the wireless access point 131. As previously discussed, note again that the communications 152-43 are not limited to merely respective wireless channel quality feedback information. Such communications 152-43 can further include useful information such as the type (and corresponding priority) of data and/or amount of data at the mobile communication device 121 in a data buffer of the mobile communication device 121 waiting for transmission over the wireless communication link 171 to the wireless access point 131.

After generating the respective link quality feedback information as requested by the communications 151-B2 (such as broadcast communications including a UCQ Request), the mobile communication device 122 also communicates the respective link quality feedback information associated with the wireless channel WCH1 to the wireless access point 131 via communications 162-42 (such as UCQ response). Accordingly, the wireless access point 131 and corresponding communication management resource 141 receives feedback indicating corresponding channel quality associated with the wireless communication link 171 and the wireless communication link 172.

In such an instance, the wireless access point 131 is now aware of the ability of the wireless channel WCH1 to convey respective wireless signals from the mobile communication device 122 to the wireless access point 131. Note that the communications 162-42 are not limited to merely respective wireless channel quality feedback information. Such communications 162-42 can further include useful information such as the type (and corresponding priority) of data and/or amount of data at the mobile communication device 122 in a respective buffer of the mobile communication device 122 waiting for transmission over the wireless communication link 171 to the wireless access point 131.

As further shown in this example, and in a similar manner as previously discussed at operation 410, the wireless access point 131 and corresponding communication management resource 141 in operation 420 implements a respective scheduler to determine best upcoming use of the wireless channel WCH1 in view of the information (communications 152-43) received from the mobile communication device 121 and the information (communications 162-42) received from the mobile communication device 122. See FIG. 6 for an example of feedback information provided by each mobile communication device.

Figure 6:
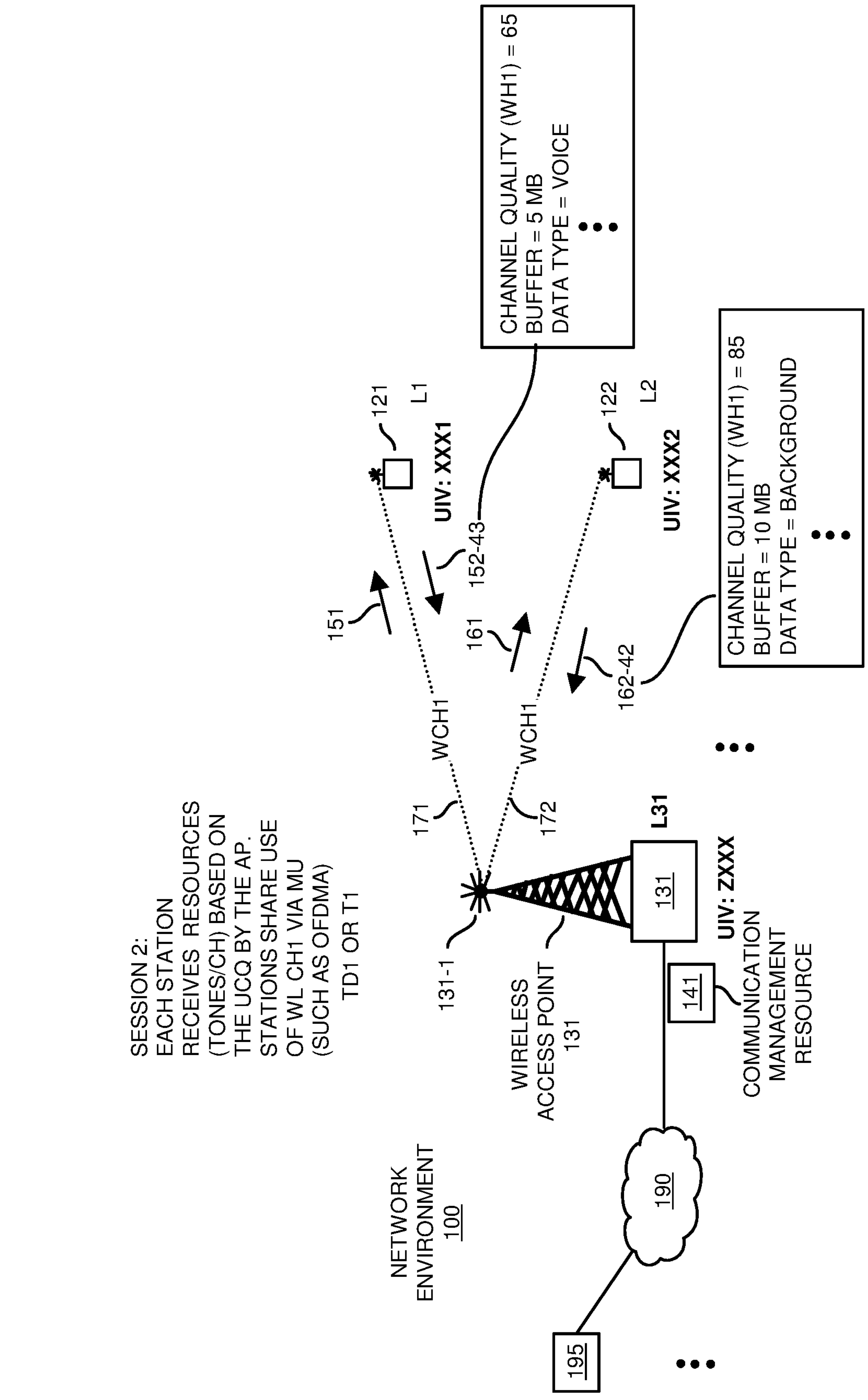
FIG. 6 is an example diagram illustrating operating conditions associated with the wireless network at or around time duration TD2 or time T2 as described herein.

FIG. 6 is an example diagram illustrating operating conditions associated with the wireless network at or around time duration TD2 or time T2 as described herein.

In this example, for session 2, in response to receiving a request for channel quality feedback information or other status information associated with the mobile communication device 121, the mobile communication device 121 provides information in communications 152-43 indicating a channel quality of receiving communications form the wireless access point 131 over the wireless channel WCH1 as 65 (where channel quality is based on a scale of 0 to 100, where 0 is the worst channel quality and where 100 is the best channel quality); the mobile communication device 121 has a low buffer of 5 Megabytes; the type of data in the buffer is Voice data, high priority.

Further in this example, in response to receiving a request for channel quality feedback information, the mobile communication device 122 provides information in communications 162-42 indicating a channel quality of receiving communications from the wireless access point over wireless channel WCH1 as 85 or very good quality (where channel quality is based on a scale of 0 to 100, where 0 is the worst channel quality and where 100 is the best channel quality); the mobile communication device 122 has a buffer of 10 Megabytes; the type of data in the buffer is Background, lowest priority.

In this example, because the channel quality associated with the wireless communication link 172 is better than the channel quality associated with the wireless communication link 171, the allocation of wireless channel WCH1 is better suited for use by the communication device 122. Although, note that it still may be desirable to allocate simultaneous use of wireless resources for communicating over both of the wireless communication links 171 and 172.

Referring again to FIG. 4, in operation 420, based on the received wireless station feedback information, the wireless access point 131 determines that the mobile communication device 122 experiences a low amount of wireless interference associated with the wireless channel WCH1 with respect to the mobile communication device 121 experiences a moderate amount of wireless interference associated with the wireless channel WCH1. In such an instance, since both the mobile communication device 121 and the mobile communication device 122 both can benefit from allocation of wireless resources associated with the wireless channel WCH1, and the quality associated with wireless communication links 171 and 172 is quite good, the wireless access point 131 and corresponding communication management resource splits use of the next time slot or time duration (in time or frequency such as tones) for assignment of a first portion (such as first tones) of the channel WCH1 to the mobile communication device 121 for transmitting respective data in the uplink over wireless channel WCH1 and wireless communication link 171 and assignment of a second portion (such as second tones) of the channel WCH1 to the mobile communication device 122 for transmitting respective data in the uplink over wireless channel WCH1 and wireless communication link 172. Thus, instead of allocating a respective one or more time slots and corresponding wireless channel WCH1 to only one of the communication devices, another option as discussed herein is simultaneous allocation of a respective wireless channel WCH1 and one or more time slots to multiple communication devices including mobile communication device 121 and mobile communication device 122.

More specifically, the communication management resource 141 can be configured to split use of the next time slot (or any time slot) of a respective time-slotted communication system to the two wireless stations, granting each of them a suitable portion of the available tones. As an example, a typical 20 MHz channel can be divided in the frequency domain to 9 resource units, each of which includes 26 different tones. Thus, the wireless access point 131 and corresponding communication management resource 141 can be configured to allocate 4 resource units (4*26=104 tones) to the first wireless station and the remaining 5 resource units to the second wireless station.

As previously discussed, the wireless access point 131 and corresponding communication management resource 141 can be configured to select the wireless channel WCH1 for simultaneous assignment and use by the mobile communication device 121 and mobile communication device 122 based on other factors such as because the mobile communication device has a very high amount of data stored in the respective buffer for communication to the wireless access point 131. Additionally or alternatively, the wireless access point 131 and corresponding communication management resource 141 can be configured to select the wireless channel WCH1 for simultaneous assignment to the mobile communication device 121 and the mobile communication device 122 based on other factors such as because the mobile communication device 121 and the mobile communication device 122 have approximately equal priority data for transmission to the wireless access point 131.

As further shown in this example, via communications 151-B3 such as a multi-user trigger frame message including an identity such as XXX1 of the mobile communication device 121 and an identity such as XXX2 of the mobile communication device 122 and notification of shared assignment of different portions of the particular time slot or time duration of wireless channel WCH1 to the mobile communication device 121 and the mobile communication device 122, the wireless access point 131 and corresponding communication management resource 141 provides notification of simultaneous assignment and/or allocation of the next available TXOP (time slot, time duration, etc.) associated with the wireless channel WCH1 to the mobile communication device 121 and the mobile communication device 122 to transmit in the uplink over wireless channel WCH1 to the wireless access point 131.

In response to receiving the assignment or allocation of the respective wireless bandwidth resources (such as time slot, time duration, first set of tones, etc.) via communications 151-B3, the mobile communication device 121 implements a listen before talk function (also known as clear channel assessment) to determine if and when the wireless channel WCH1 is free from other wireless stations communicating over the wireless channel below a threshold level for a predetermined amount of time. When the mobile communication device 121 acquires the wireless channel WCH1 in response to implementing the listen before talk function and determining that the channel is free, the mobile communication device 121 wirelessly communicates, via communications 152-44, the data in its buffer to the wireless access point 131 over the allocated portions of wireless channel WCH1 and corresponding wireless communication link 171 during the allocated and acquired time slot of wireless channel WCH1.

Additionally, in response to receiving the assignment or allocation of the respective wireless bandwidth resources (such as time slot, time duration, first set of tones, etc.) via communications 151-B3, the mobile communication device 122 implements a listen before talk function to determine if and when the wireless channel WCH1 is free from other wireless stations communicating over the wireless channel below a threshold level for a predetermined amount of time. When the mobile communication device 122 acquires the wireless channel WCH1 in response to implementing the listen before talk function and the channel is free, the mobile communication device 122 wirelessly communicates, via communications 162-43, the data in its buffer to the wireless access point 131 over the wireless channel WCH1 and corresponding wireless communication link 172 during the allocated and acquired time slot of wireless channel WCH1.

In response to receiving the data transmitted over the uplink from the mobile communication device 121 to the wireless access point 131, as well as receiving the data transmitted over the uplink from the mobile communication device 122 to the wireless access point 131, the wireless access point 131 and corresponding communication management resource 141 transmit communications 151-B4 to the mobile communication device 121 and mobile communication device 122. The communications 151-B4 provide notification to the mobile communication device 121 that the wireless access point 131 and corresponding communication management resource 141 received the communications 152-44 from the mobile communication device 121. The communications 151-B4 also provide notification to the mobile communication device 122 that the wireless access point 131 and corresponding communication management resource 141 received the communications 162-43 from the mobile communication device 121.

Thus, in the second session (session 2), the wireless access point 131 splits use of the wireless channel WCH1 for use by both the first mobile communication device 121 and the second mobile communication device 122. For example, the wireless access point 131 "shares" the wireless channel WCH1 between the mobile communication device 121 and mobile communication device 122 based on their channel quality (both channel quality are relatively good for wireless channel WCH1) and other criteria such as data urgency and buffer size. Thus, techniques herein include enabling of the wireless access point 131 to receive the channel quality feedback information such as from each wireless station participating in the balanced link mode and scheduling use of the wireless channel WCH1 accordingly.

It is further noted that channel quality feedback from many mobile communication devices becomes useful. For example, if only a single wireless channel exists and is available for use amongst multiple wireless stations, assume that 20 wireless stations in the network environment 100 are contending for its resources. The communication management resource 141 can be configured to assign bandwidth resources judiciously as previously discussed. For example, of the 20 wireless stations, assume that 15 of the mobile communication devices are farther away from the wireless access point 131 compared to the remainder of 5 mobile communication devices being near the wireless access point 131. Assigning equal (or other arbitrary) tones to all 15 wireless stations would not yield the best channel utilization. Why? Because the tones assigned to far away 15 wireless stations would likely only be used for lower MCS transmissions leading to greater resource waste. The wireless access point 131 and corresponding communication management resource 141 assign the wireless resources to the wireless communication links providing the best quality and wireless bit rates for a given wireless transmit energy.

Figure 7:
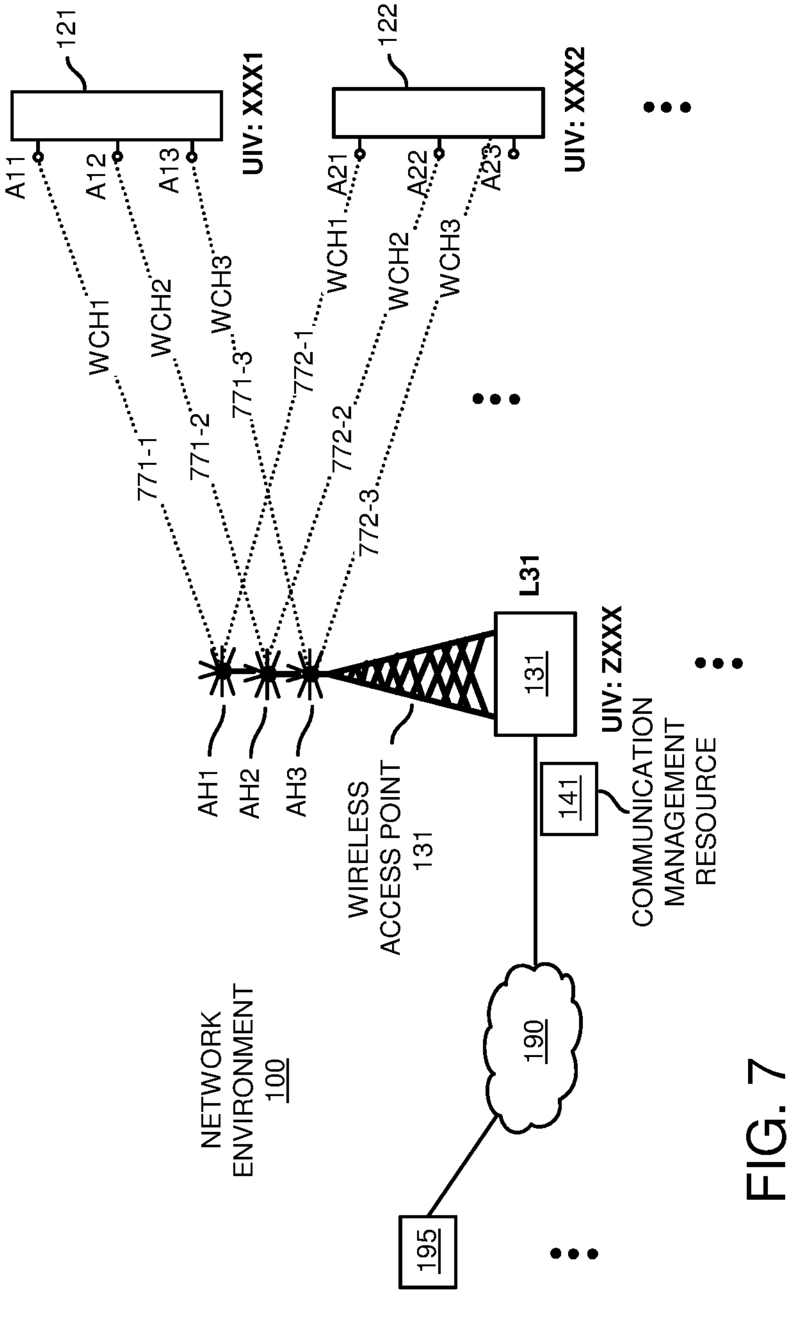
FIG. 7 is an example diagram illustrating a communication environment and a wireless access point/communication management resource (such as implementing load-balancing and and/or communication scheduling) over multiple different wireless channels in different wireless bands as discussed herein.

FIG. 7 is an example diagram illustrating a communication environment and a wireless access point/communication management resource (such as implementing load-balancing and and/or communication scheduling) over multiple different wireless channels in different wireless bands as discussed herein.

In a similar manner as previously discussed, network environment 100 includes server resource 195, network 190, wireless access point 131, and one or more instances of user equipment such as mobile communication device 121, mobile communication device 122, etc. Network environment 100 includes any number of wireless access points and any number of corresponding mobile communication devices.

Also, in a similar manner as previously discussed, the wireless access point 131 provides wireless connectivity to one or more mobile communication devices to the remote network. However, in this example, each of the wireless stations includes multiple antennas supporting different frequency bands.

For example, the wireless access point 131 includes antenna hardware AH1, antenna hardware AH2, and antenna hardware AH3. Assume in this example that the antenna hardware AH1 supports communications in the 2.4 GHz (Gigahertz) range (2.4 to 2.5 GHZ); the antenna hardware AH2 supports communications in the 5 GHz (Gigahertz) range 5.1 to 5.9 GHz; the antenna hardware AH3 supports communications in the 6 GHz (Gigahertz) range 5.9 to 7.1 GHz.

The wireless access point 131 supports simultaneous use of multiple wireless channels over a so-called multiple-link system (multiple wireless communication links) to communicate with multiple mobile communication devices including mobile communication device 121 and mobile communication device 122.

Each of the mobile communication devices includes appropriate antenna hardware to support communications with the wireless access point 131 at different sign wireless channels.

For example, the mobile communication device 121 includes antenna hardware A11 to support communications over the 2.4 GHz range; the antenna hardware A12 supports communications in the 5 GHz (Gigahertz) range; the antenna hardware A13 supports communications in the 6 GHz (Gigahertz) range.

The mobile communication device 122 includes antenna hardware A21 to support communications over the 2.4 GHz range; the antenna hardware A22 supports communications in the 5 GHz (Gigahertz) range; the antenna hardware A23 supports communications in the 6 GHz (Gigahertz) range.

In a manner as previously discussed, the communication management resource 141 provides scheduling and/or load-balancing with respect to the wireless stations using the different wireless resources such as wireless channel WCH1 (such as a wireless channel in the 2.4 GHz range), wireless channel WCH2 (such as a wireless channel in the 5 GHz range), and wireless channel WCH3 (such as a wireless channel in the 6 GHZ range). The scheduling and/or load-balancing results in more efficient use of the available wireless resources.

In this example, the wireless access point 131 and mobile communication device 121 establish wireless communication link 771-1 between the antenna hardware AH1 of the wireless access point 131 and the antenna hardware A11 of the mobile communication device 121. The wireless communication link 771-1 supports uplink and downlink communications between the wireless access point 131 and the mobile communication device 121 over the wireless channel WCH1.

The wireless access point 131 and mobile communication device 121 establish wireless communication link 771-2 between the antenna hardware AH2 of the wireless access point 131 and the antenna hardware A12 of the mobile communication device 121. The wireless communication link 771-2 supports uplink and downlink communications between the wireless access point 131 and the mobile communication device 121 over the wireless channel WCH2.

The wireless access point 131 and mobile communication device 121 establish wireless communication link 771-3 between the antenna hardware AH3 of the wireless access point 131 and the antenna hardware A13 of the mobile communication device 121. The wireless communication link 771-3 supports uplink and downlink communications between the wireless access point 131 and the mobile communication device 121 over the wireless channel WCH3.

Further in this example, the wireless access point 131 and mobile communication device 122 establish wireless communication link 772-1 between the antenna hardware AH1 of the wireless access point 131 and the antenna hardware A21 of the mobile communication device 122. The wireless communication link 772-1 supports uplink and downlink communications between the wireless access point 131 and the mobile communication device 122 over the wireless channel WCH1.

The wireless access point 131 and mobile communication device 122 establish wireless communication link 772-2 between the antenna hardware AH2 of the wireless access point 131 and the antenna hardware A22 of the mobile communication device 122. The wireless communication link 772-2 supports uplink and downlink communications between the wireless access point 131 and the mobile communication device 122 over the wireless channel WCH2.

The wireless access point 131 and mobile communication device 122 establish wireless communication link 772-3 between the antenna hardware AH3 of the wireless access point 131 and the antenna hardware A23 of the mobile communication device 122. The wireless communication link 772-3 supports uplink and downlink communications between the wireless access point 131 and the mobile communication device 122 over the wireless channel WCH3.

Still further, note that each of the wireless stations (wireless access point 131, mobile communication device 121, mobile communication device 122, etc.) in the network environment 100 can be configured to implement a respective clear channel assessment function over each of the different bands or wireless channels (WCH1, WCH2, and WCH3) prior to transmitting communications in the network environment 100 over those different bands or wireless channels.

For example, the mobile communication device 121 can be configured to implement a listen before talk function in which the mobile communication device 121 needs to acquire a respective wireless channel (WCH1, WCH2, WCH3) before it is allowed to communicate in the uplink direction to the wireless access point 131 over a respective wireless channel. Acquisition of the respective wireless channel by the mobile communication device 121 may include the mobile communication device 121 detecting that a power level of wireless signals transmitted in the respective wireless channel is below a threshold level for a listen before talk time duration. As further discussed herein, it is possible that a respective mobile communication device is allocated simultaneous use of multiple wireless channels to communicate in the network environment 100.

As further discussed herein, the communication management resource 141 associated with the wireless access point is configured to monitor one or more attributes (such as channel quality associated with each different wireless channel, buffer status associated with each mobile communication device, priority information associated with data in the buffer to be transmitted over a respective wireless communication link, etc.) associated with the mobile communication devices to determine a most efficient allocation of available wireless resources to the different mobile communication devices.

Note that the BL mode as described herein is compatible with the MLO feature introduced in 802.11be. In the context of MLO, the proposed balanced link mode as discussed herein can be implemented in the upper-MAC (such as UMAC) in the SME for each MLD (Multi-Link Device).

If the balanced link mode capability flag (of the mobile communication device or wireless access point) is set to 1 indicating that it is a multi-link device (MLD): i) in a manner as previously discussed, the STA MLD gathers the instantaneous CQI (channel quality feedback information) at each interface (such as antenna hardware AH11, antenna hardware A12, antenna hardware A13, antenna hardware A21, etc.) according to the set of enabled interfaces at different links.

As further discussed herein, upon receiving the UCQ-REQUEST on any of the active links, the receiving wireless station (mobile communication device) reports the UCQ (channel link quality) of all links to the AP within a single BL-RESPONSE frame, transmitted over all/one active link(s). The wireless access point 131 (such as MLD wireless access point) keeps a log of all the links' occupancy for all wireless stations. If the occupancy on one or more links is consistently high for a particular mobile communication device, the wireless access point 131 (operating in the MLD mode) may decide to move all the traffic of that wireless station to the less-congested links (and corresponding wireless channel) and teardown the highly congested or ultra-congested link. Note that the link teardown by the communication management resource 141 or other suitable entity may be performed on a per link basis for each link that experience high wireless interference. For example, if the wireless link 771-3 is deemed to sufficiently poor, it can be terminated, leaving the mobile communication device 121 use of remaining wireless communication links 771-1 and 771-2.

Figure 8:
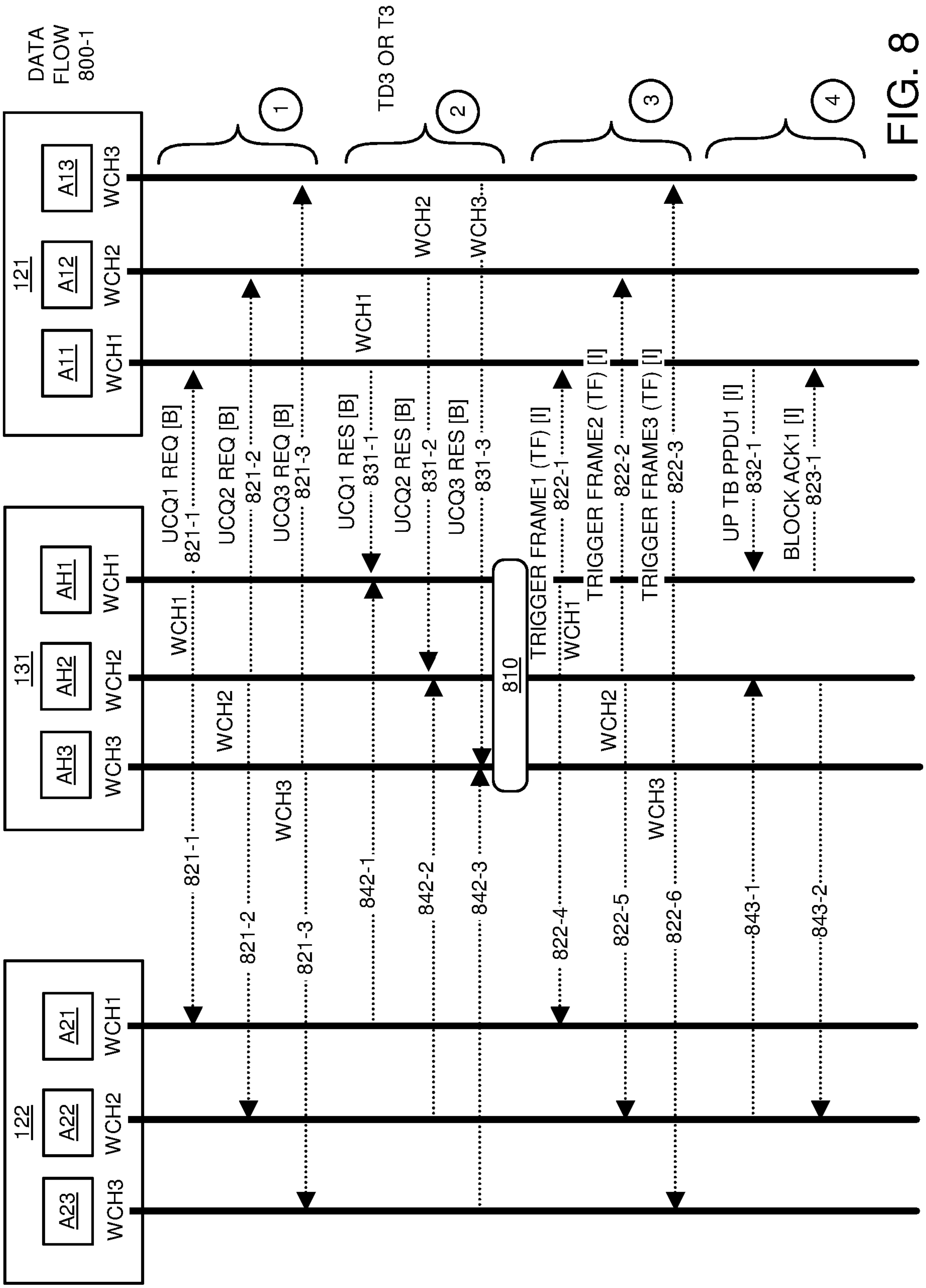
FIGS. 8 and 9 are example data flow diagrams illustrating receipt of wireless channel link quality feedback information and scheduling of wireless communications over different wireless channels based on received wireless channel link quality feedback information as discussed herein.
Figure 9:
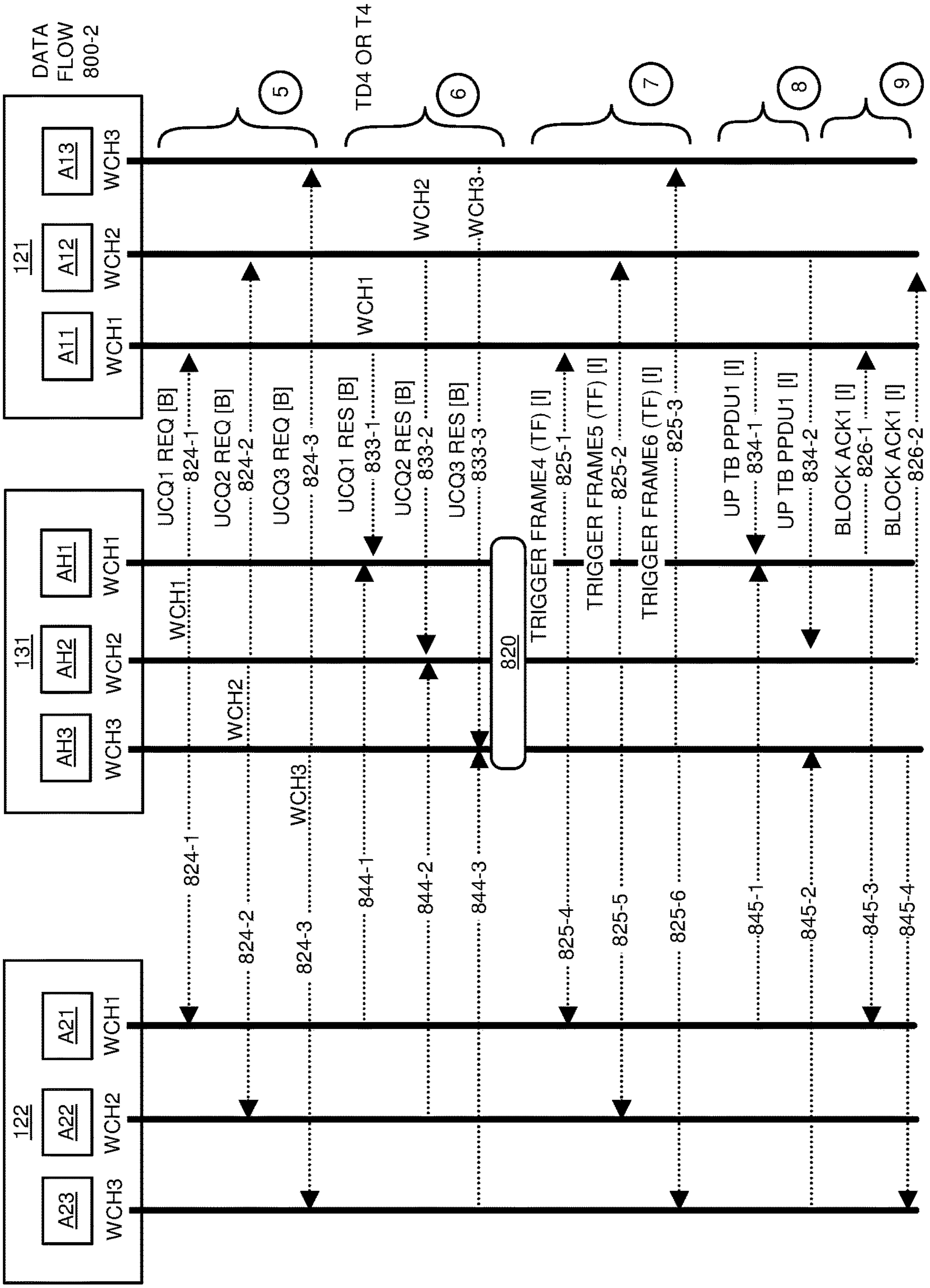

FIGS. 8 and 9 are example data flow diagrams illustrating receipt of wireless channel link quality feedback information and scheduling of wireless communications over different wireless channels based on the received wireless channel link quality feedback information as discussed herein.

In this example of data flow 800-1 in FIG. 8, note that operations #1 through operation #4 occur around time T3 or time duration TD3 during which the communication management resource 141 monitors parameters such channel quality and/or other parameters associated with the different wireless communication links and mobile communication devices. The communication management resource 141 allocates use of wireless channel WCH1 to the mobile communication device 121 for efficient use of wireless resources. The communication management resource 141 allocates use of wireless channel WCH2 to the mobile communication device 122 for efficient use of wireless resources. In one example, the communication device 122 uses the wireless channel WCH2 to communicate first data to the wireless access point 131 at the same time that the communication device 121 uses the wireless channel WCH1 to communicate second data to the wireless access point 131. For example, in operation #1 of data flow 800-1 in FIG. 8, the communication management resource 141 communicates a respective link quality feedback collection command over each of the different wireless channels WCH1, WCH2, and WCH3 to the mobile communication device 121 and potentially to other listening mobile communication devices. The command notifies the mobile communication device 121 and mobile communication devices to provide respective feedback associated with each of the different wireless communication links the corresponding channels.

For example, via communications 821-1, the wireless access point 131 transmits a command notifying the respective recipient mobile communication device 121 to generate channel quality feedback information associated with reception of wireless signals over the wireless channel WCH1. If desired, the wireless access point 131 and corresponding communication management resource 141 can be configured to transmit a respective one or more reference signals in the network environment 100 over wireless channel WCH1. In response to receiving the respective communications 821-1, for the wireless channel WCH1 and communication link 771-1, the mobile communication device 121 determines a wireless power level of receiving wireless communications (such as reference signals of known transmit power level transmitted over the wireless channel WCH1) from the wireless access point 131 and generates corresponding channel quality feedback for wireless channel WCH1 and wireless communication link 771-1 based on receipt of those reference signals.

Note again that the channel quality feedback information generated by each of the mobile communication devices or feedback information can include any information or performance metrics such as wireless interference information for wireless channel WCH1, a signal to noise ratio of the respective mobile communication device receiving wireless signals transmitted by the wireless access point 131, a bit error rate associated with receiving wireless communications from the wireless access point 131, a data rate associated with receiving wireless communications from the wireless access point 131, etc. Thus, the channel quality feedback information, as its name suggests, includes channel quality information associated with wireless channel WCH1. The channel quality information generated for the corresponding communication device 121 and corresponding wireless channel WCH1 in this example provides a respective indication to the communication management resource 141 of the link quality associated with the wireless communication link 771-1.

Via communications 821-2, the wireless access point 131 transmits a command notifying the respective recipient mobile communication device 121 to generate channel quality feedback information associated with reception of wireless signals over the wireless channel WCH2. If desired, the wireless access point 131 and corresponding communication management resource 141 can be configured to transmit a respective one or more reference signals in the network environment 100 over wireless channel WCH2. In response to receiving the respective communications 821-2, for the wireless channel WCH2 and communication link 771-2, the mobile communication device 121 determines a wireless power level of receiving wireless communications from the wireless access point 131 over wireless channel WCH2. Note that the channel quality feedback information generated by each of the mobile communication device for wireless communication link 771-2 may include any information such as a wireless interference information for wireless channel WCH2, signal to noise ratio of the respective mobile communication device receiving wireless signals transmitted by the wireless access point 131, a bit error rate associated with receiving wireless communications from the wireless access point 131, a data rate associated with receiving wireless communications from the wireless access point 131, etc. Thus, the channel quality feedback information, as its name suggests, includes channel quality information associated with wireless channel WCH2. The channel quality information generated for the corresponding communication device 121 and corresponding wireless channel WCH2 provides a respective indication to the communication management resource 141 of the link quality associated with the wireless communication link 771-2 and corresponding wireless channel WCH2.

Via communications 821-3, the wireless access point 131 transmits a command notifying the respective recipient mobile communication device 121 to generate channel quality feedback information associated with reception of wireless signals over the wireless channel WCH3 and corresponding wireless communication link 771-3. If desired, the wireless access point 131 and corresponding communication management resource 141 can be configured to transmit a respective one or more reference signals in the network environment 100 over wireless channel WCH3. In response to receiving the respective communications 821-3, for the wireless channel WCH3 and communication link 771-3, the mobile communication device 121 determines a power level of receiving wireless communications from the wireless access point 131 other suitable entity over the wireless channel WCH3. Note that the channel quality feedback information generated by each of the mobile communication device for wireless communication link 771-3 may include any information such as wireless interference information for wireless channel WCH3, a signal to noise ratio of the respective mobile communication device receiving wireless signals transmitted by the wireless access point 131, a bit error rate associated with receiving wireless communications from the wireless access point 131, a data rate associated with receiving wireless communications from the wireless access point 131, etc. Thus, the channel quality feedback information, as its name suggests, includes channel quality information associated with wireless channel WCH3. The channel quality information generated for the corresponding communication device 121 and corresponding wireless channel WCH3 provides a respective indication to the communication management resource 141 of the link quality associated with the wireless communication link 771-3 and corresponding wireless channel WCH3.

As a response to receiving the feedback generation command in the communications 821-1, the mobile communication device 121 also transmits the generated channel quality feedback information for wireless channel WCH1 in communications 831-1 over the antenna hardware A11 to the antenna hardware AH1 of the wireless access point 131.

As a response to receiving the feedback generation command in the communications 821-2, the mobile communication device 121 also transmits the generated channel quality feedback information for wireless channel WCH2 in communications 831-2 over the antenna hardware A12 to the antenna hardware AH2 of the wireless access point 131.

As a response to receiving the feedback generation command in the communications 821-3, the mobile communication device 121 also transmits the generated channel quality feedback information for wireless channel WCH3 in communications 831-3 over the antenna hardware A13 to the antenna hardware AH3 of the wireless access point 131.

Thus, the wireless access point 131 and corresponding communication management resource 141 receive notification of the different link qualities associated with the wireless communication link 771-1, wireless communication link 771-2, and wireless communication link 771-3.

As a response to receiving the feedback generation command in the communications 821-1 over the wireless channel WCH1, the mobile communication device 122 monitors link quality and also transmits the generated channel quality feedback information for wireless channel WCH1 in communications 842-1 over the antenna hardware A21 to the antenna hardware AH1 of the wireless access point 131.

As a response to receiving the feedback generation command in the communications 821-2 over the wireless channel WCH2, the mobile communication device 122 monitors link quality and also transmits the generated channel quality feedback information for wireless channel WCH2 in communications 842-2 over the antenna hardware A22 to the antenna hardware AH2 of the wireless access point 131.

As a response to receiving the feedback generation command in the communications 821-3 over the wireless channel WCH3, the mobile communication device 122 monitors link quality and also transmits the generated channel quality feedback information for wireless channel WCH3 in communications 842-3 over the antenna hardware A23 to the antenna hardware AH3 of the wireless access point 131.

Thus, the wireless access point 131 and corresponding communication management resource 141 receive notification of the different link qualities associated with the wireless communication link 772-1, wireless communication link 772-2, and wireless communication link 772-3.

In processing operation 810, the communication management resource 141 of the wireless access point 131 analyzes the received feedback information from the mobile communication devices for each of the different wireless channels and corresponding wireless communication links. Note further that the wireless access point 131 and corresponding communication management resource 141 can be configured to receive similar channel quality feedback information from each of multiple mobile communication devices in the network environment 100.

Based upon current conditions of the network environment 100 as indicated by the respective channel quality feedback information from the mobile communication device 121 for each of the wireless channels WCH1, WCH2, and WCH3, and respective channel quality feedback information from the mobile communication device 122 for each of the wireless channels WCH1, WCH2, and WCH3, the communication management resource 141 schedules allocation of the different wireless channels for use by the mobile communication devices.

More specifically, as previously discussed, transmission of the communications 821-1 and the wireless network environment 100 prompts any of one or more mobile communication devices 121, 122, etc., using the wireless channel WCH1 to provide respective channel quality feedback information.

Assume in this example that the mobile communication device 121 uses any of the available communication links 771 to transmit VIDEO data on the uplink to the wireless access point 131. The mobile communication device 121 uses any assigned bandwidth resources to transmit video to the wireless access point 131. In other words, any of the available wireless communication links between the mobile communication device 121 and the wireless access point 131 can be used to provide conveyance of data when they are free. Additionally, any of the available wireless communication links and corresponding wireless channels between the mobile communication device 122 and the wireless access point 131 can be used to provide conveyance of data when they are free. Thus, congestion may occur on one channel. However, is most likely that one or more other channels is able to provide good link quality and conveyance of wireless communications.

Furtherance in this example, in operation #2, assume that the mobile communication device 121 for wireless channel WCH1 and corresponding wireless communication link 771-1 provides feedback in communications 831-1 of: i) wireless channel WCH1 quality: 85 (very good channel quality), ii) data buffer=15 MB of data to transmit, iii) priority of buffer data: VIDEO.

For operation #2, the mobile communication device 121 for wireless channel WCH2 and corresponding wireless communication link 771-2 provides feedback in communications 831-2 of: i) wireless channel WCH2 quality: 8 (very bad channel quality), ii) data buffer=15 MB of data to transmit, iii) priority of buffer data: VIDEO.

For operation #2, the mobile communication device 121 for wireless channel WCH3 and corresponding wireless communication link 771-3 provides feedback in communications 831-3 of: i) wireless channel WCH3 quality: 8 (very bad channel quality), ii) data buffer=15 MB of data to transmit, iii) priority of buffer data: VIDEO.

As previously discussed, the communications 821-1, 821-2, and 821-3 also prompt the mobile communication device 122 to provide channel quality feedback to the wireless access point 131.

In operation #2, via communications 842-1, assume that the mobile communication device 122 for wireless channel WCH1 and corresponding wireless communication link 772-1 provides feedback of: i) wireless channel WCH1 quality: 23 (fairly processor channel quality), ii) data buffer=15 MB of data to transmit, iii) priority of buffer data: VIDEO.

For operation #2, via communications 842-2, the mobile communication device 122 for wireless channel WCH2 and corresponding wireless communication link 772-2 provides feedback of: i) wireless channel WCH2 quality: 98 (very good channel quality), ii) data buffer=15 MB of data to transmit, iii) priority of buffer data: VIDEO.

For operation #2, via communications 842-3, the mobile communication device 122 for wireless channel WCH3 and corresponding wireless communication link 772-3 provides feedback of: i) wireless channel WCH3 quality: 13 (very bad channel quality), ii) data buffer=15 MB of data to transmit, iii) priority of buffer data: VIDEO.

Based on the channel quality feedback information from the multiple mobile communication devices and different supported wireless channels for time T3 or time duration TD3, the communication management resource 141 of the wireless access point 131 determines that the wireless channel WCH1 can be used by the mobile communication device 121 for wireless communication link 771-1 with good allocation efficiency because the channel quality for wireless channel WCH1 is very high with respect to poor wireless channel quality associated with each of the other wireless channels at time duration TD3 or timeT3 for the mobile communication device 122. In other words, the communication management resource 141 detects that the wireless channel WCH1 is the least congested channel and wireless communication link 771-1 is the least congested link.

Accordingly, via communications 822-1, the communication management resource 141 notifies the mobile communication device 121 that a particular time slot or time duration or tones of the wireless channel WCH1 has/have been allocated for subsequent use by the wireless communication link 771-1 to communicate data from the mobile communication device 121 over the wireless communication link 771-1 to the wireless access point 131 in a next timeslot (or TXOP) for time T3 or time duration TD3. As previously discussed, the communication device 121 must implement a respective clear channel assessment before communicating over the allocated one or more time slots.

If desired, the communication management resource 141 can be configured to notify (such as via communications 822-2 and 822-3) the mobile communication device 121 (or other mobile communication devices) that wireless channels WCH2 and WCH3 are not being assigned for use to the mobile communication device 121. Alternatively, failure of sending communications 822-2 and 822-3 may indicate that wireless channels WCH2 and WCH3 are not being assigned for use to the mobile communication device 121.

As further shown in operation #3, based on the channel quality feedback information from the multiple mobile communication devices and different supported wireless channels for time T3 or time duration TD3 as previously discussed, the communication management resource 141 of the wireless access point 131 determines that the wireless channel WCH2 can be used by the mobile communication device 122 for wireless communication link 772-2 with good allocation efficiency because the channel quality for wireless channel WCH2 is very high with respect to poor wireless channel quality associated with each of the other wireless channels at time duration TD3 or timeT3 for the mobile communication device 122. In other words, the communication management resource 141 detects that the wireless channel WCH2 is the least congested channel and wireless communication link 772-2 may use this channel to support conveyance of communications between the communication device 122 and the wireless access point 131.

Accordingly, via communications 822-5, the communication management resource 141 notifies the mobile communication device 122 that a particular time slot or time duration (associated with time duration TD3 or time T3) or tones of the wireless channel WCH2 has/have been allocated for subsequent use by the wireless communication link 772-2 to communicate data from the mobile communication device 122 over the wireless communication link 772-2 to the wireless access point 131 in a next timeslot (or TXOP) for time T3 or time duration TD3.

If desired, the communication management resource 141 can be configured to notify (such as via communications 822-4 and 822-6) the mobile communication device 122 (or other mobile communication devices) that wireless channels WCH1 and WCH3 are not being assigned for use to the mobile communication device 122. Alternatively, failure of sending communications 822-4 and 822-6 may indicate that wireless channels WCH1 and WCH3 are not being assigned for use to the mobile communication device 122 in time duration TD3.

Further, in a manner as previously discussed, in operation #4, based on the allocation of wireless channel WCH1, via communications 832-1, the mobile communication device 121 transmits all or a portion of the available data (VIDEO data) in its buffer over the wireless communication link 771-1 and wireless channel WCH1 from antenna hardware A11 to the antenna hardware AH1 of the wireless access point 131 subsequent to implementing a clear channel assessment function (listen before talk function) and determining that the wireless channel WCH1 is clear. In other words, as previously discussed, even though allocated use of a respective time duration or time slot of the wireless channel WCH1, the mobile communication device 121 performs a clear channel assessment of an allocated time slot of the wireless channel WCH1 prior to transmitting the data in its buffer over the wireless communication link 771-1.

Communications 823-1 from the wireless access point 131 to the mobile communication device 121 over the wireless channel WCH1 provide a confirmation to the mobile communication device 121 that the wireless access point 131 received the data from the mobile communication device 121 via communication 832-1.

Further, in operation #4, based on the allocation of wireless channel WCH2 to the mobile communication device 122, via communications 843-1, the mobile communication device 122 transmits all or a portion of the available data (VIDEO data) in its buffer over the wireless communication link 772-2 and wireless channel WCH2 from antenna hardware A22 to the antenna hardware AH2 of the wireless access point 131 subsequent to implementing a clear channel assessment function (listen before talk function) and determining that the wireless channel WCH2 is clear. In other words, as previously discussed, even though allocated use of a respective time duration TD3 or time slot 3 of the wireless channel WCH1, the mobile communication device performs a clear channel assessment of an allocated time slot of the wireless channel WCH2 prior to transmitting the data in its buffer.

Communications 843-2 from the wireless access point 131 to the mobile communication device 122 provide a confirmation to the mobile communication device 122 that the wireless access point 131 received the data from the mobile communication device 122 via communication 843-2.

Thus, in this example, each of the communication devices is allocated a most efficient channel for their use.

Note that allocation of one or more wireless channels to different communication devices in the uplink direction is shown by way of nonlimiting example only. No similar manner, the wireless channels can be allocated in the downlink direction for use by the wireless access point 131 to communicate corresponding communications to the corresponding communication devices.

As previously discussed, the use of wireless channels and amount of interference may change over time. Eventually, over time, the wireless interference in other wireless channels WCH2 and WCH3 may reduce, resulting in the communication management resource 141 allocating those wireless channels at appropriate times of low interference (high respective channel quality) to the different mobile communication devices for use.

Operations #5-8

In this example of data flow 800-2 in FIG. 9, note that operations #5 through operation #8 occur around time T4 or time duration TD4 during which the communication management resource 141 monitors parameters such channel quality and/or other parameters associated with the different wireless communication links and mobile communication devices. As further discussed below, the communication management resource 141 allocates use of wireless channels WCH1 and WCH2 to the mobile communication device 121 for efficient use of wireless resources around time T4 and around time duration TD4. The communication management resource 141 allocates use of wireless channels WCH3 to the mobile communication device 122 for efficient use of wireless resources around time T4 and around time duration TD4.

For example, in operation #5 of data flow 800-2 in FIG. 9, the communication management resource 141 communicates a respective feedback collection command over each of the different wireless channels WCH1, WCH2, and WCH3 to the mobile communication device 121 and potentially to other listening mobile communication devices such as mobile communication device 122. The command in communications 824-1 notify the mobile communication device 121 and mobile communication device 122 to provide respective feedback associated with each of the different wireless communication links.

Note that communication of respective commands to provide channel quality feedback is shown by way of example only. In accordance with further examples, each of the wireless stations as discussed herein such as mobile communication devices can be configured to periodically perform link quality assessment associated the different wireless channels and provide link quality assessment information to the wireless access point 131 and corresponding communication management resource 141.

For example, via communications 824-1, the wireless access point 131 transmits a command notifying the respective recipient mobile communication device 121 and communication device 122 to generate channel quality feedback information associated with reception of wireless signals over the wireless channel WCH1. If desired, the wireless access point 131 and corresponding communication management resource 141 can be configured to transmit a respective one or more reference signals in the network environment 100 over wireless channel WCH1. In response to receiving the respective communications 824-1, for the wireless channel WCH1 and communication link 771-1, the mobile communication device 121 determines a wireless power level of receiving wireless communications from the wireless access point 131 and generates corresponding channel quality feedback for wireless channel WCH1 and wireless communication link 771-1. In response to receiving the respective communications 824-1, for the wireless channel WCH1 and communication link 772-1, the mobile communication device 122 determines a wireless power level of receiving wireless communications (such as a reference signal) over the wireless channel WCH1 from the wireless access point 131 and generates corresponding channel quality feedback for wireless channel WCH1 and wireless communication link 772-1.

Note that the channel quality feedback information generated by each of the mobile communication devices or feedback information can include any information or performance metrics such as wireless interference information for wireless channel WCH1, a signal to noise ratio of the respective mobile communication device receiving wireless signals transmitted by the wireless access point 131, a bit error rate associated with receiving wireless communications from the wireless access point 131, a data rate associated with receiving wireless communications from the wireless access point 131, etc. Thus, the channel quality feedback information, as its name suggests, includes channel quality information associated with wireless channel WCH1.

Via communications 824-2, the wireless access point 131 transmits a command notifying the respective recipient mobile communication device 121 and communication device 122 to generate channel quality feedback information associated with reception of wireless signals over the wireless channel WCH2. If desired, the wireless access point 131 and corresponding communication management resource 141 can be configured to transmit a respective one or more reference signals in the network environment 100 over wireless channel WCH2. In response to receiving the respective communications 824-2, for the wireless channel WCH2 and communication link 771-2, the mobile communication device 121 determines a wireless power level of receiving wireless communications from the wireless access point 131. In response to receiving the respective communications 824-2, for the wireless channel WCH2 and communication link 772-2, the mobile communication device 122 determines a wireless power level of receiving wireless communications (such as a reference signal) from the wireless access point 131 over the wireless channel WCH2.

Note that the channel quality feedback information generated by each of the mobile communication devices may include any information such as a wireless interference information for wireless channel WCH2, signal to noise ratio of the respective mobile communication device receiving wireless signals transmitted by the wireless access point 131, a bit error rate associated with receiving wireless communications from the wireless access point 131, a data rate associated with receiving wireless communications from the wireless access point 131, etc. Thus, the channel quality feedback information, as its name suggests, includes channel quality information associated with wireless channel WCH2.

Via communications 824-3, the wireless access point 131 transmits a command notifying the respective recipient mobile communication device 121 and communication device 122 to generate channel quality feedback information associated with reception of wireless signals over the wireless channel WCH3 and corresponding wireless communication link 771-3. If desired, the wireless access point 131 and corresponding communication management resource 141 can be configured to transmit a respective one or more reference signals in the network environment 100 over wireless channel WCH3. In response to receiving the respective communications 824-3, for the wireless channel WCH3 and communication link 771-3, the mobile communication device 121 determines a power level of receiving wireless communications from the wireless access point 131. In response to receiving the respective communications 824-3, for the wireless channel WCH3 and communication link 772-3, the mobile communication device 122 determines a power level of receiving wireless communications (such as a reference signal) from the wireless access point 131 over the wireless channel WCH3.

Note that the channel quality feedback information generated by each of the mobile communication devices for wireless channel WCH3 may include any information such as wireless interference information for wireless channel WCH3, a signal to noise ratio of the respective mobile communication device receiving wireless signals transmitted by the wireless access point 131, a bit error rate associated with receiving wireless communications from the wireless access point 131, a data rate associated with receiving wireless communications from the wireless access point 131, etc. Thus, the channel quality feedback information, as its name suggests, includes channel quality information associated with wireless channel WCH3.

As a response to receiving the feedback generation command in the communications 824-1, the mobile communication device 121 also transmits the generated channel quality feedback information for wireless channel WCH1 in communications 833-1 over the antenna hardware A11 to the antenna hardware AH1 of the wireless access point 131.

As a response to receiving the feedback generation command in the communications 824-2, the mobile communication device 121 also transmits the generated channel quality feedback information for wireless channel WCH2 in communications 833-2 over the antenna hardware A12 to the antenna hardware AH2 of the wireless access point 131.

As a response to receiving the feedback generation command in the communications 824-3, the mobile communication device 121 also transmits the generated channel quality feedback information for wireless channel WCH3 in communications 833-3 over the antenna hardware A13 to the antenna hardware AH3 of the wireless access point 131.

As a response to receiving the feedback generation command in the communications 824-1, the mobile communication device 122 also transmits the generated channel quality feedback information for wireless channel WCH1 in communications 844-1 over the antenna hardware A21 to the antenna hardware AH1 of the wireless access point 131.

As a response to receiving the feedback generation command in the communications 824-2, the mobile communication device 122 also transmits the generated channel quality feedback information for wireless channel WCH2 in communications 844-2 over the antenna hardware A22 to the antenna hardware AH2 of the wireless access point 131.

As a response to receiving the feedback generation command in the communications 824-3, the mobile communication device 122 also transmits the generated channel quality feedback information for wireless channel WCH3 in communications 844-3 over the antenna hardware A23 to the antenna hardware AH3 of the wireless access point 131.

In processing operation 820, subsequent to receiving the different link qualities associated with the wireless communication links and corresponding channels, the communication management resource 141 of the wireless access point 131 analyzes the received feedback information from the mobile communication device for each of the different wireless channels and corresponding wireless communication links. Note further that the wireless access point 131 and corresponding communication management resource 141 can be configured to receive similar channel quality feedback information from each of multiple mobile communication devices. Based upon current conditions of the network environment 100 as indicated by the respective channel quality feedback information from the mobile communication device 121 for each of the wireless channels WCH1, WCH2, and WCH3, and respective channel quality feedback information from the mobile communication device 122 for each of the wireless channels WCH1, WCH2, and WCH3, the communication management resource 141 schedules allocation of the different wireless channels for use by the mobile communication devices.

More specifically, as previously discussed, transmission of the communications 824-1 and the wireless network environment 100 prompts any of one or more mobile communication devices 121, 122, etc., using the wireless channel WCH1 to provide respective channel quality feedback information.

Assume in this example that the mobile communication device 121 uses any of the available communication links 771 (such as communication link 771-1, communication link 771-2, communication link 771-3) to transmit VIDEO data on the uplink to the wireless access point 131. The mobile communication device 121 uses any assigned bandwidth resources to transmit video to the wireless access point 131.

In operation #6, assume that the mobile communication device 121 for wireless channel WCH1 and corresponding wireless communication link 771-1 provides feedback in communications 833-1 of: i) wireless channel WCH1 quality: 85 (very good channel quality), ii) data buffer=15 MB of data to transmit, iii) priority of buffer data: VIDEO.

For operation #2, the mobile communication device 121 for wireless channel WCH2 and corresponding wireless communication link 771-2 provides feedback in communications 833-2 of: i) wireless channel WCH2 quality: 98 (very good channel quality), ii) data buffer=15 MB of data to transmit, iii) priority of buffer data: VIDEO.

For operation #2, the mobile communication device 121 for wireless channel WCH3 and corresponding wireless communication link 771-3 provides feedback in communications 833-3 of: i) wireless channel WCH3 quality: 8 (very bad channel quality), ii) data buffer=15 MB of data to transmit, iii) priority of buffer data: VIDEO.

As previously discussed, the communications 824-1, 824-2, and 824-3 also prompt the mobile communication device 122 to provide channel quality feedback to the wireless access point 131.

In operation #2, via communications 844-1, assume that the mobile communication device 122 for wireless channel WCH1 and corresponding wireless communication link 772-1 provides feedback of: i) wireless channel WCH1 quality: 78 (very good channel quality), ii) data buffer=15 MB of data to transmit, iii) priority of buffer data: BACKGROUND.

For operation #2, via communications 844-2, the mobile communication device 122 for wireless channel WCH2 and corresponding wireless communication link 772-2 provides feedback of: i) wireless channel WCH2 quality: 8 (very bad channel quality), ii) data buffer=15 MB of data to transmit, iii) priority of buffer data: VIDEO.

For operation #2, via communications 844-3, the mobile communication device 122 for wireless channel WCH3 and corresponding wireless communication link 772-3 provides feedback of: i) wireless channel WCH3 quality: 93 (very good channel quality), ii) data buffer=15 MB of data to transmit, iii) priority of buffer data: VIDEO.

Based on the channel quality feedback information from the multiple mobile communication devices and different supported wireless channels for time T4 or time duration TD4, the communication management resource 141 of the wireless access point 131 determines that the wireless channel WCH1 can be used by the mobile communication device 121 for wireless communication link 771-1 with good allocation efficiency because the channel quality for wireless channel WCH1 is very high with respect to poor wireless channel quality associated with other wireless channel WCH3 at time duration TD4 or timeT4. In other words, the communication management resource 141 detects that the wireless channel WCH1 is one of the least congested channel and wireless communication link 771-1.

Accordingly, via communications 825-1, the communication management resource 141 notifies the mobile communication device 121 that a particular one or more time slots or time durations or tones of the wireless channel WCH1 has/have been allocated for subsequent use by the wireless communication link 771-1 to communicate data from the mobile communication device 121 over the wireless communication link 771-1 to the wireless access point 131 in a next timeslot (or TXOP) for time T4 or time duration TD4.

Based on the channel quality feedback information from the multiple mobile communication devices and different supported wireless channels for time T4 or time duration TD4, the communication management resource 141 of the wireless access point 131 determines that the wireless channel WCH2 can be used by the mobile communication device 121 for wireless communication link 771-2 with good allocation efficiency because the channel quality for wireless channel WCH2 is very high with respect to poor wireless channel quality associated with each of the other wireless channels at time duration TD4 or timeT4. In other words, the communication management resource 141 detects that the wireless channel WCH2 is another least congested channel and wireless communication link 771-2 is thus least congested link.

Accordingly, via communications 825-2, the communication management resource 141 notifies the mobile communication device 121 that a particular time slot or time duration or tones of the wireless channel WCH2 has/have been allocated for subsequent use by the wireless communication link 771-2 to communicate data from the mobile communication device 121 over the wireless communication link 771-2 to the wireless access point 131 in a next timeslot (or TXOP) for time T4 or time duration TD4.

Based on the channel quality feedback information from the multiple mobile communication devices and different supported wireless channels for time T4 or time duration TD4, the communication management resource 141 of the wireless access point 131 determines that the wireless channel WCH3 can be used by the mobile communication device 122 for wireless communication link 772-3 with good allocation efficiency because the channel quality for wireless channel WCH3 is very high with respect to poor wireless channel quality associated with each of the other wireless channels at time duration TD4 or timeT4. In other words, the communication management resource 141 detects that the wireless channel WCH3 is another least congested channel and wireless communication link 773-2 is thus a least congested link.

Because the link quality feedback information from the mobile communication device 122 for wireless channel WCH1 is quite good, the communication management resource 141 can be configured to allocate use of a portion of tones associated with the wireless channel WCH1 to the mobile communication device as well in operation #7. In other words, the communication management resource and corresponding scheduler can be configured to simultaneously allocate use of the wireless channel WCH1 to both the mobile communication device 121 and the mobile communication device 122.

The wireless channel WCH2 is not allocated for use by the mobile communication device 122 because it provides poor channel quality to the mobile communication device 122.

The wireless channel WCH3 is allocated for use by the mobile communication device 122 and not mobile communication device 121 because it provides good channel quality to only mobile communication device 122.

If desired, the communication management resource 141 can be configured to notify (such as via communications 825-3) the mobile communication device (or other mobile communication devices) that wireless channels WCH3 is not being assigned for use to the mobile communication device 121. Alternatively, failure of sending communications 825-3 may indicate that wireless channels WCH3 are not being assigned for use to the mobile communication device 121.

In a manner as previously discussed, in operation #8, based on the allocation, via communications 834-1, the mobile communication device 121 transmits all or a portion of the available data (VIDEO data) in its buffer over the wireless communication link 771-1 and wireless channel WCH1 from antenna hardware A11 to the antenna hardware AH1 of the wireless access point 131 subsequent to implementing a clear channel assessment function (listen before talk function) and determining that the wireless channel WCH1 is clear. In other words, as previously discussed, even though allocated use of a respective time duration or time slot of the wireless channel WCH1, the mobile communication device performs a clear channel assessment of an allocated time slot of the wireless channel WCH1 prior to transmitting the data in its buffer.

Also, in operation #8, based on the allocation, via communications 834-2, the mobile communication device 121 transmits all or a portion of the available data (VIDEO data) in its buffer over the wireless communication link 771-2 and wireless channel WCH1 from antenna hardware A12 to the antenna hardware AH2 of the wireless access point 131 subsequent to implementing a clear channel assessment function (listen before talk function) and determining that the wireless channel WCH2 is clear. In other words, as previously discussed, even though allocated use of a respective time duration or time slot of the wireless channel WCH2, the mobile communication device performs a clear channel assessment of an allocated time slot of the wireless channel WCH2 prior to transmitting the data in its buffer.

Also, in operation #8, via communications 845-1, based on the allocation, the mobile communication device 122 can be configured to transmits all or a portion of the available data in its buffer over a respective wireless communication link using allocated wireless channel WCH1 when it detects the wireless channel WCH1 is clear via clear channel assessment.

Further in operation #8, via communications 845-2, based on the allocation, the mobile communication device 122 can be configured to transmit all or a portion of the available data in its buffer over a respective wireless communication link using allocated wireless channel WCH3 when it detects the wireless channel WCH3 is clear via clear channel assessment.

Communications 826-1 from the wireless access point 131 to the mobile communication device 121 provide a confirmation to the mobile communication device 121 that the wireless access point 131 received the data from the mobile communication device 121 via communication 834-1.

Communications 826-2 from the wireless access point 131 to the mobile communication device 121 provide a confirmation to the mobile communication device 121 that the wireless access point 131 received the data from the mobile communication device 121 via communication 834-2.

Communications 845-3 from the wireless access point 131 to the mobile communication device 122 provide a confirmation to the mobile communication device 122 that the wireless access point 131 received the data from the mobile communication device 122 via communication 845-1.

Communications 845-4 from the wireless access point 131 to the mobile communication device 122 provide a confirmation to the mobile communication device 122 that the wireless access point 131 received the data from the mobile communication device 122 via communication 845-2.

As previously discussed, the use of wireless channels and amount of interference may change over time. Eventually, over time, the wireless interference in other wireless channel WCH3 may decrease, resulting in the communication management resource 141 allocating this wireless channel at appropriate times of low interference (high respective channel quality) to the different mobile communication devices for use.

Accordingly, as discussed herein, the communication management resource 141 and can be configured to implement load balancing techniques for balanced link mode such as:

A Least Congestion Link (LCL)

Upon a flow arrival and detection of data available for transmission from a respective wireless station, the communication management resource 141 selects the less congested interface (such as indicated by the best channel quality) and allocates the new incoming data flow of a buffer for transmission over the selected wireless interface (such as antenna hardware providing the least wireless congestion and best wireless data through put channel quality. In other words, the communication management resource 141 selects a respective least congested link and corresponding wireless channel in which to assign to a respective wireless station for communication of respective data from that respective wireless station to a target wireless station.

Note further that the wireless access point 131 and corresponding communication management resource can be configured to keep a log of uplink and downlink channel occupancy times to teardown respective per-wireless station links that exceed a maximum allowable congestion amount. In other words, if a respective wireless channel and corresponding wireless communication link experience sufficiently high congestion of above a threshold level such as based on detecting that the wireless link quality is poor, the indication management resource 141 can be configured to terminate use of that particular wireless channel and corresponding wireless communication link. However, as previously discussed, each mobile communication device in the network environment 100 can be configured to support mobile channel and multi-wireless communication links. Terminating one of those links because it provides poor quality leaves the mobile communication device with other links that may provide better quality.

Multi-Link Least Congestion (MLLC)

As previously discussed, the wireless access point corresponding communication management resource 141 can be configured to support MultiLink connectivity via multiple different wireless communication links to each of one or more mobile communication devices. Upon a flow arrival such as an indication that a respective mobile communication device or wireless station has data for transmission, the communication management resource 140 can be configured to distribute the new incoming flow's traffic accordingly to the observed channel occupancy at the wireless access point 131.

As a specific example, let Ti denote the percentage of available (free) channel airtime at link i. If Ti<Tmin, the communication management resource 141 discards (terminates) the link and use of the corresponding wireless channel. For all the remaining links and available wireless channels, the fraction of the flow's traffic over each wireless communication link and corresponding wireless channel is allocated in accordance with Ti/sum(Ti).

Figure 10:
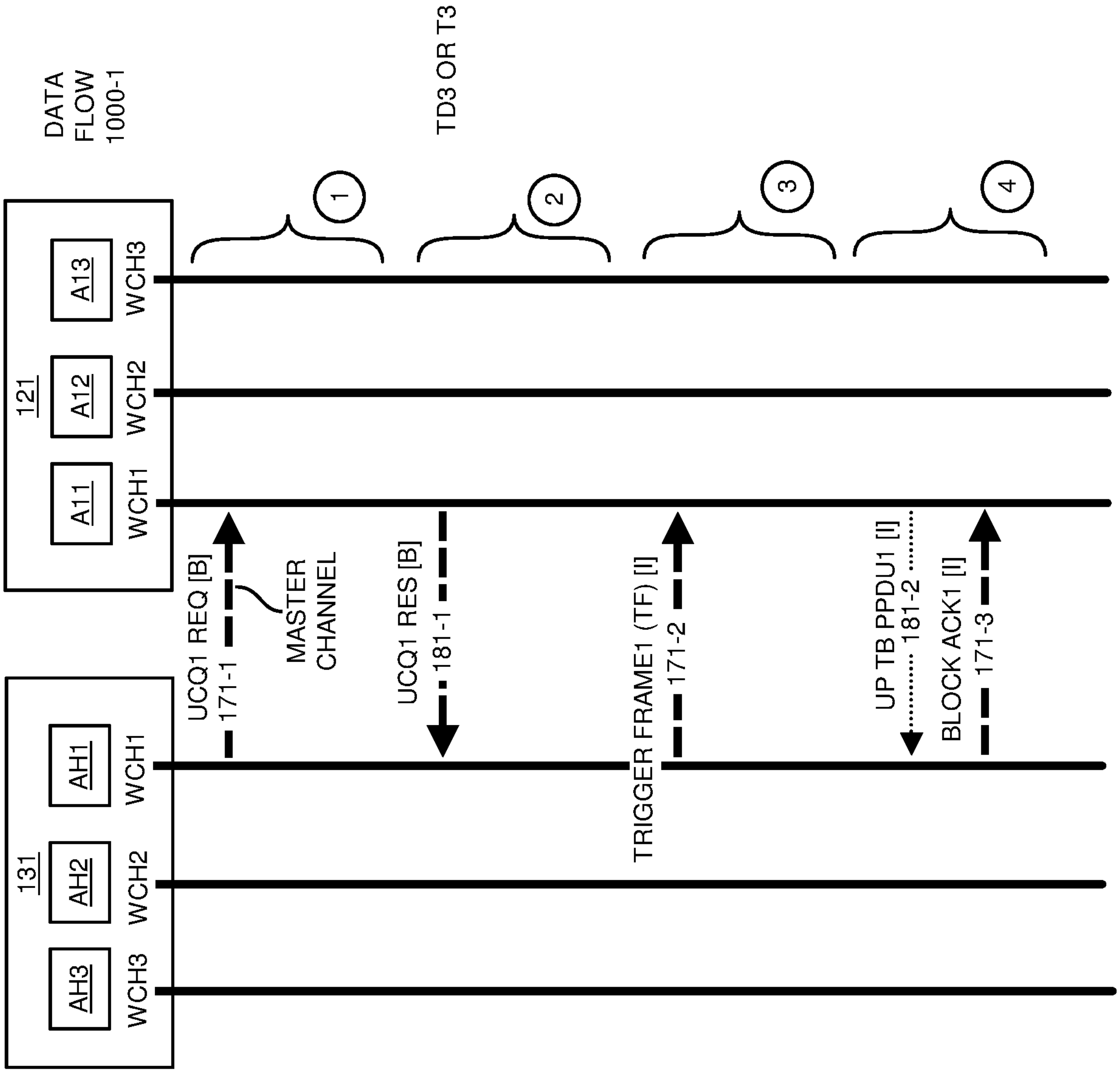
FIGS. 10 and 11 are example data flow diagrams illustrating implementation of a master wireless channel, receipt of wireless channel link quality feedback information, and scheduling of wireless communications over different wireless channels based on the received wireless channel link quality feedback information as discussed herein.
Figure 11:
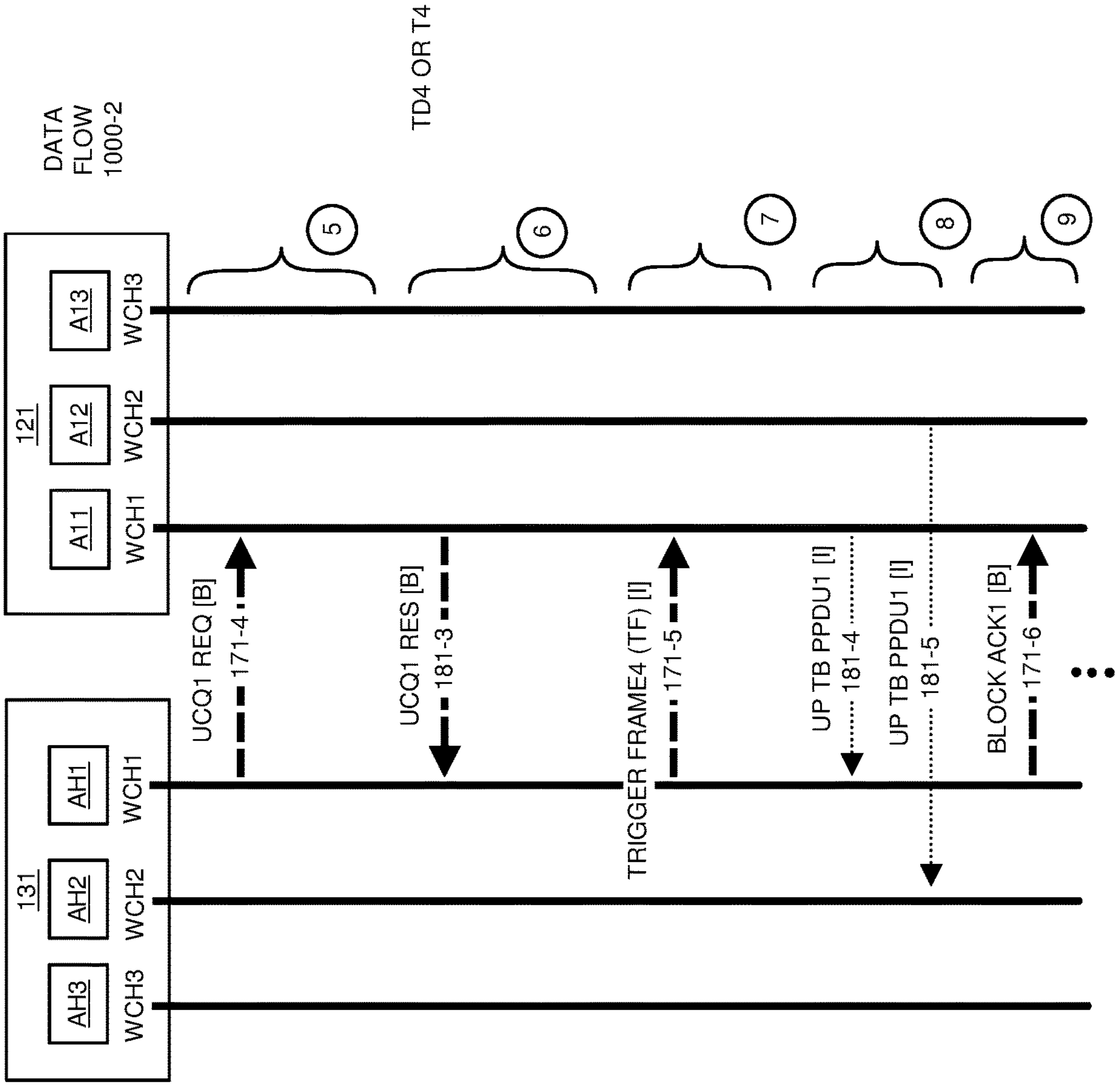

FIGS. 10 and 11 are example data flow diagrams illustrating implementation of a master wireless channel, receipt of wireless channel link quality feedback information, and scheduling of wireless communications over different wireless channels based on the received wireless channel link quality feedback information as discussed herein.

As shown in FIG. 10 and corresponding data flow 1000-1, via communications 171-1 over a master channel, the wireless access point 131 notifies the mobile communication device 121 to perform a measurement of channel quality over each of multiple wireless channels WCH1, WCH2, and WCH3.

Via communications 181-1 over the master channel, the mobile communication device 121 provides the channel quality feedback associated with each of the wireless channels WCH1, WCH2, and WCH3. An example of the feedback is shown in communications 831-1, 831-2, and 831-3 in FIG. 8.

Referring again to FIG. 10, via communications 171-2 over the master channel, the wireless access point 131 provides notification that wireless channel WCH1 has been allocated for use by the antenna hardware A11 to communicate over wireless communication link 771-1 to the for the same reasons as previously discussed in FIG. 8.

Via communications 181-2 over the wireless communication link 771-1, the mobile communication device 121 communicates data to the antenna hardware AH1 of the wireless access point 131.

Via communications 171-3 over the master channel, the wireless access point 131 provides notification to the mobile communication device 121 of the wireless access point 131 receiving the transmitted data over the wireless channel WCH1.

As shown in FIG. 11 and corresponding data flow 1000-2, via communications 171-4 over the master channel, the wireless access point 131 notifies the mobile communication device 121 to perform a measurement of channel quality over each of multiple wireless channels WCH1, WCH2, and WCH3.

Via communications 181-3 over the master channel (a.k.a., primary channel, or management channel, etc.), the mobile communication device 121 provides the channel quality feedback associated with each of the wireless channels WCH1, WCH2, and WCH3. An example of the feedback is shown in communications 833-1, 833-2, and 833-3 in FIG. 9.

Referring again to FIG. 11, via communications 171-5 over the master channel, the wireless access point 131 provides notification that wireless channel WCH1 and wireless channel WCH2 have been allocated for use by the antenna hardware A11 and A12 to communicate over wireless communication link 771-1 and wireless communication link 771-2 to the wireless access point 131 for the same reasons as previously discussed in FIG. 9.

Via communications 181-4 over the wireless communication link 771-1, the mobile communication device 121 communicates data in an assigned time slot or time duration to the antenna hardware AH1 of the wireless access point 131.

Via communications 181-5 over the wireless communication link 771-2, the mobile communication device 121 communicates data over antenna hardware A12 in the assigned time slot or time duration to the antenna hardware AH2 of the wireless access point 131.

Via communications 171-6 over the master channel, the wireless access point 131 provides notification of receiving the transmitted data over the wireless channel WCH1 and wireless channel WCH2.

Thus, a primary channel or master channel can be configured to convey information such as channel sensing information and the transmission/reception of management frames, such as UCQ request and UCQ response frame. When the first wireless access point 131 wants to request a channel link quality measurement, as previously discussed, the communication management resource 141 sends a request on the primary channel to each of one or more wireless stations as previously discussed, and, optionally, on the alternative individual links to the respective wireless station, as well. Upon receiving a link quality request from the first wireless access point, each respective wireless station performs a channel link quality measurement on all the available links/tones, and sends a complete report of same to the first wireless access point such as over the primary channel and optionally on the alternative (secondary) link(s).

One reason to transmit the generated channel quality information from a respective wireless station to the first wireless access point over the primary channel (master channel) and also individually over other wireless channels is that the communicated copy of the same link quality information (i.e. the UCQ Response/Request frame) over multiple channels increases the system reliability and ensures that the recipient such as the first wireless access point receives the information. In other words, redundancy ensures that the first wireless access point receives the channel quality information from the respective wireless station.

Figure 12:
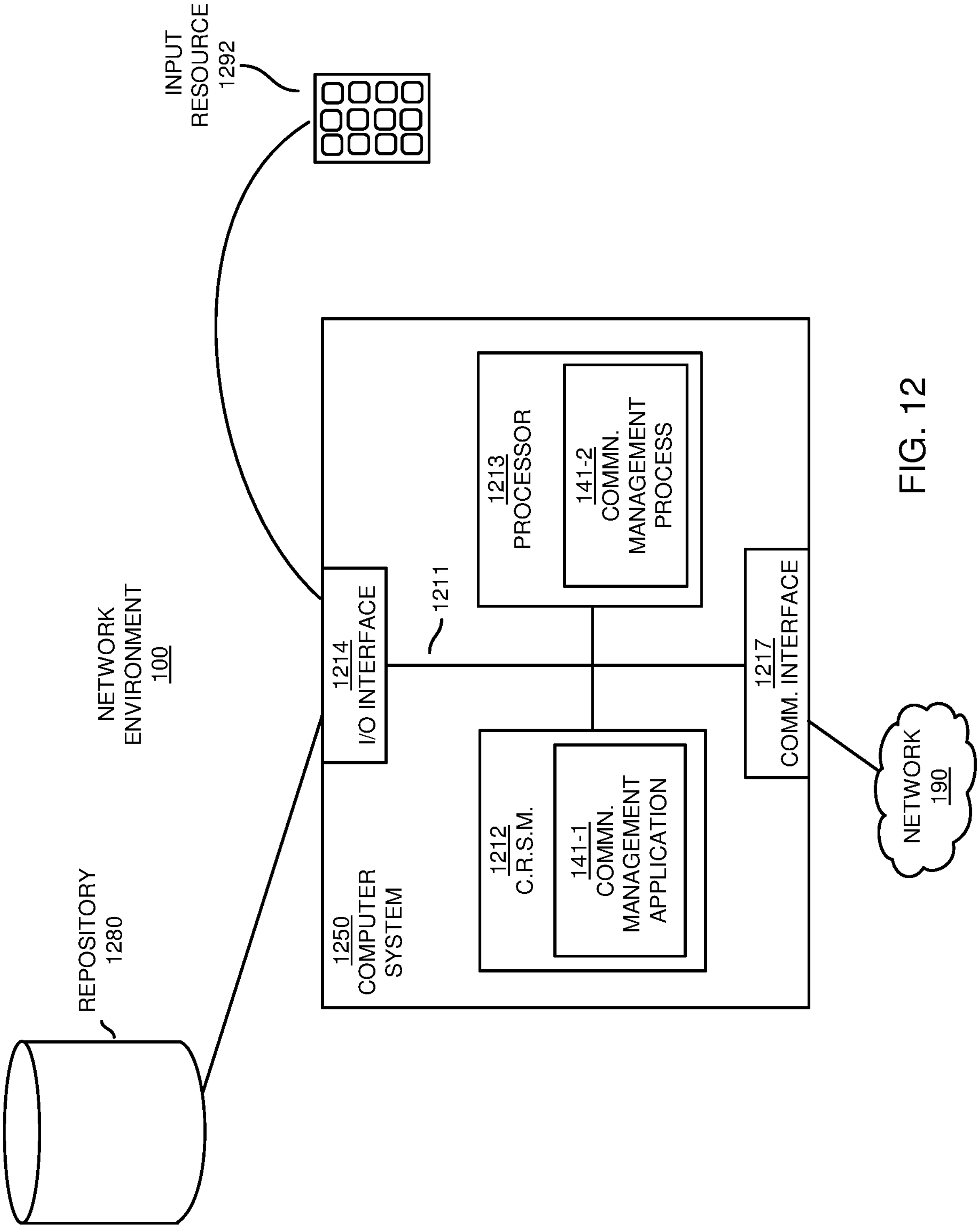
FIG. 12 is an example diagram illustrating example computer architecture operable to execute one or more operations according to examples herein.

FIG. 12 is an example block diagram of a computer system for implementing any of the operations as previously discussed according to examples herein.

Any of the resources (such as wireless stations, communication management resource 141, wireless access point 131, mobile communication device, etc.) as discussed herein can be configured to include computer processor hardware and/or corresponding executable instructions to carry out the different operations as discussed herein via computer system 1250.

As shown, computer system 1250 of the present example includes an interconnect 1211 coupling computer readable storage media 1212 such as a non-transitory type of media (or more generally, computer readable hardware which can be any suitable type of hardware storage medium in which digital information can be stored and retrieved), a processor 1213 (computer processor hardware), I/O interface 1214, and a communications interface 1217.

I/O interface(s) 1214 supports connectivity to repository 1280 and input resource 1292.

Computer readable storage medium 1212 (such as computer readable hardware or other suitable entity) can be any hardware storage device such as memory, optical storage, hard drive, floppy disk, etc. In one example, the computer readable storage medium 1212 stores instructions and/or data.

As shown, computer readable storage media 1212 can be encoded with management application 140-1 (e.g., including instructions) to carry out any of the operations as discussed herein.

During operation of one example, processor 1213 accesses computer readable storage media 1212 via the use of interconnect 1211 in order to launch, run, execute, interpret or otherwise perform the instructions in management application 140-1 stored on computer readable storage medium 1212. Execution of the management application 140-1 produces management process 140-2 to carry out any of the operations and/or processes as discussed herein.

Those skilled in the art will understand that the computer system 1250 can include other processes and/or software and hardware components, such as an operating system that controls allocation and use of hardware resources to execute management application 140-1.

In accordance with different examples, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1250 may reside at any location or can be included in any suitable resource in any network environment to implement functionality as discussed herein. In one example, the control system 1250 can include or be implemented in virtualization environments such as the cloud.

Functionality supported by the different resources will now be discussed via flowchart in FIG. 13. Note that the steps in the flowcharts below can be executed in any suitable order.

Figure 13:
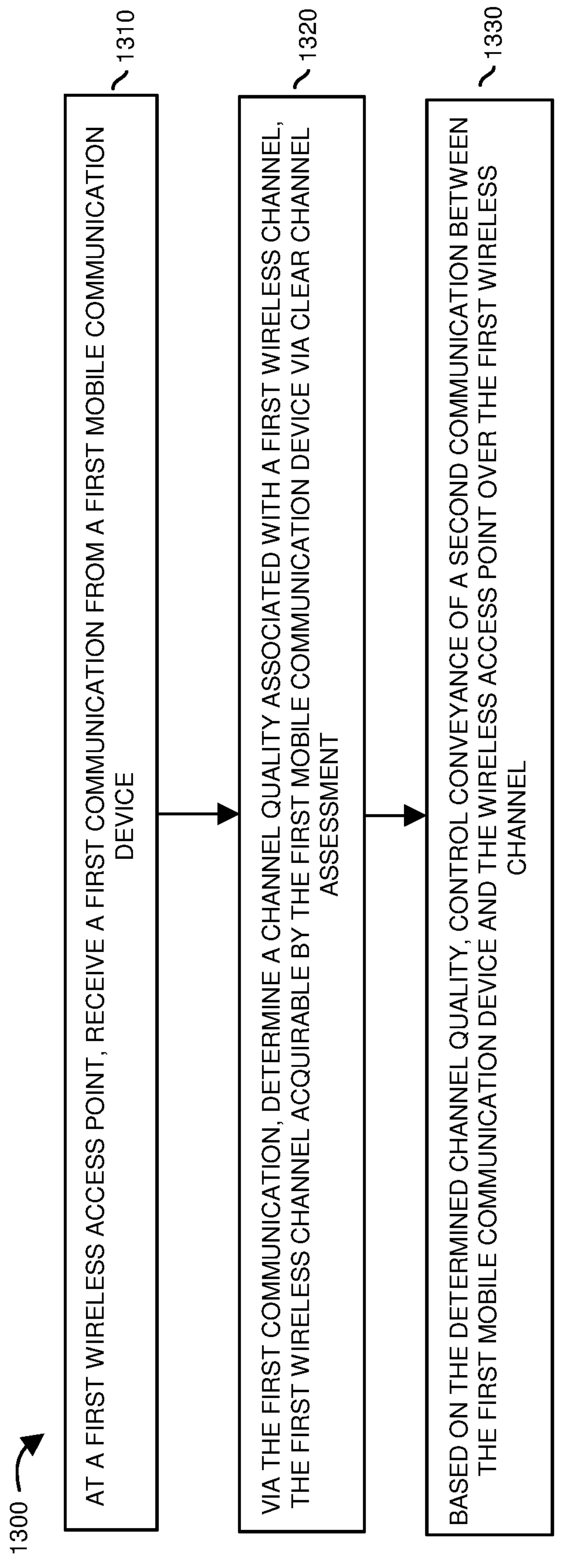
FIG. 13 is an example diagram illustrating a method according to examples herein.

FIG. 13 is a flowchart 1300 illustrating an example method according to examples. Note that flowchart 1300 overlaps/captures general concepts as discussed herein.

In processing operation 1310, the first wireless access point 131 receives a first communication from a first mobile communication device 121.

In processing operation 1320, via the first communication, the communication management resource 141 determines a channel quality associated with a first wireless channel, the first wireless channel acquirable by the first mobile communication device via clear channel assessment.

In processing operation 1330, based on the determined channel quality, the communication management resource 140 associated with the first wireless access point (such as controls conveyance of a second communication between the first mobile communication device and the wireless access point over the first wireless channel.

Note again that techniques herein are well suited to facilitate more efficient operation of providing network access. However, it should be noted that examples herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred examples thereof, it will be understood by those skilled in the art that various changes in form and details may be made therein without departing from the spirit and scope of the present application as defined by the appended claims. Such variations are intended to be covered by the scope of this present application. As such, the foregoing description of examples of the present application is not intended to be limiting. Rather, any limitations to the invention are presented in the following claims.

We claim:

1. A method comprising:

at a first wireless access point, receiving a first communication wirelessly transmitted from a first mobile communication device over a first wireless channel, the first mobile communication device required to implement a clear channel assessment function to acquire use of the first wireless channel prior to the first mobile communication device wirelessly transmitting over the first wireless channel;

via the first communication, determining a channel quality associated with the first wireless channel;

based on the determined channel quality, controlling conveyance of a second communication over a wireless communication link established between the first mobile communication device and the first wireless access point using the first wireless channel; and receiving the second communication at the first wireless access point, the second communication transmitted from the first mobile communication device over the first wireless channel in a time slot granted to the first mobile communication device by the first wireless access point, the second communication transmitted from the first mobile communication device in the granted time slot in response to the first mobile communication device detecting a wireless energy in the first wireless channel below a threshold level.

2. The method as in claim 1, wherein determining the channel quality associated with the first wireless channel includes:

retrieving channel quality feedback from the first communication, the first communication received from the first mobile communication device, the channel quality feedback indicative of a wireless signal quality associated with the first mobile communication device receiving a wireless signal transmitted from the first wireless access point over the first wireless channel to the first mobile communication device.

3. The method as in claim 1 further comprising:

receiving the first communication at the first wireless access point in response to the first wireless access point wirelessly communicating a command to the first mobile communication device, the command indicating to provide channel quality information associated with the first mobile communication device receiving a wireless signal from the first wireless access point.

4. The method as in claim 1, wherein controlling conveyance of the second communication between the first mobile communication device and the first wireless access point via the first wireless channel includes:

implementing a load balancing scheduler function, the load balancing scheduler function operative to allocate use of the first wireless channel and a second wireless channel depending on the determined channel quality associated with the first wireless channel and a determined channel quality associated with the second wireless channel.

5. The method as in claim 1 further comprising:

prior to receiving the first communication, from the first wireless access point, providing notification to the first mobile communication device that the first wireless access point supports load balancing via channel quality assessment provided by the first mobile communication device.

6. The method as in claim 1, wherein the clear channel assessment requires each of multiple mobile communication devices including the first mobile communication device to implement a respective listen before talk function to acquire use of the first wireless channel prior to transmitting over the first wireless channel.

7. The method as in claim 1, via the first communication, receiving status information indicative of a buffer status of the first mobile communication device, the buffer status indicating an amount of data queued for transmission to the first wireless access point over the first wireless channel; and wherein controlling conveyance of the second communication between the first mobile communication device and the first wireless access point via the first wireless channel includes: controlling conveyance of the second communication between the first mobile communication device and the first wireless access point over the first wireless channel based at least in part on the buffer status associated with the first mobile communication device.

8. The method as in claim 1 further comprising:

at the first wireless access point, receiving a third communication, the third communication received from the first mobile communication device;

via the third communication, determining a channel quality associated with a second wireless channel, the second wireless channel acquirable by the first mobile communication device via the clear channel assessment; and selecting amongst the first wireless channel and the second wireless channel to allocate to the first mobile communication device based on the channel quality associated with the first wireless channel and the channel quality associated with the second wireless channel.

9. The method as in claim 8, wherein selecting amongst the first wireless channel and the second wireless channel to allocate to the first mobile communication device includes:

comparing the channel quality associated with the first wireless channel and the channel quality associated with the second wireless channel; and in response to detecting that the channel quality associated with the first wireless channel is better than a channel quality associated with the second wireless channel, assigning the first wireless channel for use by the first mobile communication device to transmit the second communication from the first mobile communication device to the wireless access point.

10. The method as in claim 1, wherein the channel quality is a first channel quality associated with the first wireless channel, the method further comprising:

at the first wireless access point, receiving a third communication from a second mobile communication device;

via the third communication, determining a second channel quality associated with the first wireless channel, the first wireless channel acquirable by the second mobile communication device via clear channel assessment; and selecting allocation of the first wireless channel for use by the first mobile communication device and not the second mobile communication device based on determining that the first channel quality is greater than the second channel quality.

11. A method comprising:

at a first wireless access point, receiving a first communication wirelessly transmitted from a first mobile communication device over a first wireless channel, the first mobile communication device required to implement a clear channel assessment function to acquire use of the first wireless channel prior to the first mobile communication device wirelessly transmitting over the first wireless channel;

via the first communication, determining a channel quality associated with the first wireless channel; and based on the determined channel quality, controlling conveyance of a second communication over a wireless communication link established between the first mobile communication device and the first wireless access point using the first wireless channel;

wherein the determined channel quality is a first channel quality, the method further comprising:

at the first wireless access point, receiving a third communication from a second mobile communication device;

via the third communication, determining a second channel quality, the second channel quality associated with a second wireless channel, the second wireless channel acquirable by the first mobile communication device and the second mobile communication device via clear channel assessment; and wherein controlling conveyance of the second communication between the first mobile communication device and the wireless access point over the first wireless channel includes: based on the determined first channel quality and the determined second channel quality, controlling conveyance of the second communication between the first mobile communication device and the first wireless access point over the first wireless channel.

12. A system comprising:

communication management hardware operative to:

receive a first communication wirelessly transmitted from a first mobile communication device over a first wireless channel to a first wireless access point, the first mobile communication device required to implement a clear channel assessment function to acquire use of the first wireless channel prior to the first mobile communication device wirelessly transmitting over the first wireless channel;

via the first communication, determine a channel quality associated with the first wireless channel; and based on the determined channel quality, control conveyance of a second communication over a wireless communication link established between the first mobile communication device and the first wireless access point using the first wireless channel;

receiving the second communication at the first wireless access point, the second communication transmitted from the first mobile communication device over the first wireless channel in a time slot granted to the first mobile communication device by the first wireless access point, the second communication transmitted from the first mobile communication device in the granted time slot in response to the first mobile communication device detecting a wireless energy in the first wireless channel below a threshold level.

13. The system as in claim 12, wherein the communication management hardware is further operative to:

retrieve channel quality feedback from the first communication, the first communication received from the first mobile communication device, the channel quality feedback indicative of a wireless signal quality associated with the first mobile communication device receiving a wireless signal transmitted from the first wireless access point over the first wireless channel to the first mobile communication device.

14. The system as in claim 12, wherein the communication management hardware is further operative to:

receive the first communication at the first wireless access point in response to the first wireless access point wirelessly communicating a command to the first mobile communication device, the command indicating to provide channel quality information associated with the first mobile communication device receiving a wireless signal from the first wireless access point.

15. The system as in claim 12, wherein the communication management hardware is further operative to:

implement a load balancing scheduler function, the load balancing scheduler function operative to allocate use of the first wireless channel and a second wireless channel depending on the determined channel quality associated with the first wireless channel and a determined channel quality associated with the second wireless channel.

16. The system as in claim 12, wherein the communication management hardware is further operative to:

prior to receiving the first communication, from the first wireless access point, provide notification to the first mobile communication device that the first wireless access point supports load balancing via channel quality assessment provided by the first mobile communication device.

17. The system as in claim 12, wherein the clear channel assessment requires each of multiple mobile communication devices including the first mobile communication device to implement a respective listen before talk function to acquire use of the first wireless channel prior to transmitting over the first wireless channel.

18. The system as in claim 12, wherein the determined channel quality is a first channel quality; and wherein the communication management hardware is further operative to:

at the first wireless access point, receive a third communication from a second mobile communication device;

via the third communication, determine a second channel quality, the second channel quality associated with a second wireless channel, the second wireless channel acquirable by the first mobile communication device and the second mobile communication device via clear channel assessment; and wherein controlled conveyance of the second communication between the first mobile communication device and the wireless access point over the first wireless channel includes: based on the determined first channel quality and the determined second channel quality, control conveyance of the second communication between the first mobile communication device and the first wireless access point over the first wireless channel.

19. Computer-readable storage hardware having instructions stored thereon, the instructions, when carried out by computer processor hardware, cause the computer processor hardware to:

receive a first communication wirelessly transmitted from a first mobile communication device over a first wireless channel to a first wireless access point, the first mobile communication device required to implement a clear channel assessment function to acquire use of the first wireless channel prior to the first mobile communication device wirelessly transmitting over the first wireless channel;

via the first communication, determine a channel quality associated with the first wireless channel;

based on the determined channel quality, control conveyance of a second communication over a wireless communication link established between the first mobile communication device and the first wireless access point using the first wireless channel; and receive the second communication at the first wireless access point, the second communication transmitted from the first mobile communication device over the first wireless channel in a time slot granted to the first mobile communication device by the first wireless access point, the second communication transmitted from the first mobile communication device in the granted time slot in response to the first mobile communication device detecting a wireless energy in the first wireless channel below a threshold level.

20. The method as in claim 1, wherein controlling conveyance of the second communication between the first mobile communication device and the first wireless access point using the first wireless channel includes scheduling conveyance of the second communication in an uplink for transmission from the first mobile communication device to the first wireless access point.

21. The method as in claim 1, wherein absence of receiving link quality information feedback is used as a scheduling decision to communicate the second communication over the established wireless communication link.

22. The method as in claim 1, wherein the channel quality indicates a quality of the first mobile communication device receiving a wireless signal transmitted from the first wireless access point over the first wireless channel.

23. The method as in claim 22 further comprising:

receiving the first communication at the first wireless access point in response to the first wireless access point wirelessly communicating a command to the first mobile communication device, the command notifying the first mobile communication device to provide channel quality information associated with the first mobile communication device receiving the wireless signal.

24. The method as in claim 1, wherein the timeslot granted to the first mobile communication device is a second time slot, the method further comprising:

prior to receiving the first communication, transmitting a first grant communication from the first wireless access point, the first grant communication indicating a first time slot allocated for transmission of the first communication over the first wireless channel.

25. The method as in claim 24, wherein the first grant communication is a broadcast message transmitted to the first mobile communication device and a second mobile communication device.

26. The method as in claim 24, wherein controlling conveyance of the second communication of the wireless communication link includes:

transmitting a second grant communication from the first wireless access point to the first mobile communication device, the second grant communication scheduling the second time slot for use by the first mobile communication device to transmit the second communication over the first wireless channel to the first wireless access point based on the determined channel quality.

27. The method as in claim 1, wherein controlling conveyance of the second communication over the wireless communication link includes:

transmitting a grant communication from the first wireless access point to the first mobile communication device, the grant communication scheduling the time slot granted for use by the first mobile communication device to transmit the second communication over the first wireless channel to the first wireless access point.

28. The method as in claim 27, wherein the determined channel quality associated with the first wireless channel is based on a first quality of the first mobile communication device receiving a wireless signal transmitted from the first wireless access point, the method further comprising:

transmitting the grant communication from the wireless access point to the first mobile communication device in response to detecting that the first quality of the first mobile communication device receiving the wireless signal transmitted from the first wireless access point is greater than a second channel quality associated with a second mobile communication device receiving the wireless signal.

29. A method comprising:

at a first wireless access point, receiving a first communication wirelessly transmitted from a first mobile communication device over a first wireless channel, the first mobile communication device required to implement a clear channel assessment function to acquire use of the first wireless channel prior to the first mobile communication device wirelessly transmitting over the first wireless channel;

via the first communication, determining a channel quality associated with the first wireless channel;

based on the determined channel quality, controlling conveyance of a second communication over a wireless communication link established between the first mobile communication device and the first wireless access point using the first wireless channel;

prior to receiving the first communication, transmitting a first grant communication from the first wireless access point, the first grant communication indicating a first time slot allocated for transmission of the first communication over the first wireless channel; and transmitting the first grant communication in response to detecting that the first mobile communication device supports a scheduling mode in which the first wireless access point schedules use of the first wireless channel based at least in part on the determined channel quality associated with the first wireless channel.

* * * * *